(12) United States Patent
Mishra et al.

(10) Patent No.: US 9,166,875 B2
(45) Date of Patent: Oct. 20, 2015

(54) METHOD AND APPARATUS FOR NETWORK OPTIMIZATION USING SON SOLUTIONS

(75) Inventors: Anjali Mishra, San Diego, CA (US);
Francesco Grilli, La Jolla, CA (US);
Masato Kitazoe, Tokyo (JP); Oronzo Flore, Rome (IT); Thomas B. Wilborn, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 208 days.

(21) Appl. No.: 12/819,745

(22) Filed: Jun. 21, 2010

(65) Prior Publication Data

US 2010/0325267 A1 Dec. 23, 2010

Related U.S. Application Data

(60) Provisional application No. 61/219,224, filed on Jun. 22, 2009.

(51) Int. Cl.
| | | |
|---|---|---|
| G06F 15/173 | (2006.01) | |
| H04L 12/24 | (2006.01) | |
| H04W 24/02 | (2009.01) | |
| H04W 36/00 | (2009.01) | |
| H04W 24/08 | (2009.01) | |

(52) U.S. Cl.
CPC .......... *H04L 41/069* (2013.01); *H04L 41/0823* (2013.01); *H04W 24/02* (2013.01); *H04W 24/08* (2013.01); *H04W 36/0083* (2013.01)

(58) Field of Classification Search
USPC .................... 709/223–224; 370/216; 455/436
See application file for complete search history.

(56) References Cited

U.S. PATENT DOCUMENTS

| | | | | |
|---|---|---|---|---|
| 8,243,615 | B2* | 8/2012 | Hamalainen et al. | 370/252 |
| 8,588,057 | B2* | 11/2013 | Dimou et al. | 370/216 |
| 2002/0021671 | A1* | 2/2002 | Quinlan | 370/242 |
| 2003/0123425 | A1* | 7/2003 | Walton et al. | 370/341 |
| 2004/0052230 | A1* | 3/2004 | Soliman | 370/335 |
| 2004/0156334 | A1* | 8/2004 | Okubo | 370/329 |
| 2004/0219920 | A1* | 11/2004 | Love et al. | 455/442 |
| 2005/0119020 | A1 | 6/2005 | Cheng et al. | |
| 2005/0136911 | A1 | 6/2005 | Csapo et al. | |
| 2005/0201332 | A1 | 9/2005 | Bakshi et al. | |
| 2006/0236402 | A1* | 10/2006 | Russell et al. | 726/25 |
| 2006/0240783 | A1 | 10/2006 | Kawada | |

(Continued)

FOREIGN PATENT DOCUMENTS

| | | |
|---|---|---|
| CN | 1984420 A | 6/2007 |
| GB | 2420939 A | 6/2006 |

(Continued)

OTHER PUBLICATIONS

International Search Report and Written Opinion—PCT/US2010/039505—International Search Authority, European Patent Office, Jan. 18, 2011.

(Continued)

*Primary Examiner* — Abdullahi E Salad
(74) *Attorney, Agent, or Firm* — John J. Ketchum

(57) ABSTRACT

A method, an apparatus, and a computer program product for wireless communication are provided in which a communication event is detected, one or more aspects of the detected communication event are analyzed and at least one of the one or more aspects of the detected communication event is stored on an user equipment in a log.

27 Claims, 18 Drawing Sheets

(56) References Cited

U.S. PATENT DOCUMENTS

| | | | |
|---|---|---|---|
| 2006/0270411 A1* | 11/2006 | Grayson | 455/444 |
| 2007/0123247 A1* | 5/2007 | Hunzinger | 455/422.1 |
| 2008/0188225 A1* | 8/2008 | Park et al. | 455/438 |
| 2008/0220748 A1* | 9/2008 | Park | 455/414.1 |
| 2008/0220784 A1 | 9/2008 | Somasundaram et al. | |
| 2009/0003272 A1* | 1/2009 | Payne et al. | 370/329 |
| 2009/0028112 A1* | 1/2009 | Attar et al. | 370/332 |
| 2009/0109838 A1* | 4/2009 | Kuo | 370/216 |
| 2009/0239566 A1* | 9/2009 | Pelletier et al. | 455/517 |
| 2009/0275329 A1* | 11/2009 | Sokondar et al. | 455/434 |
| 2009/0310501 A1* | 12/2009 | Catovic et al. | 370/252 |
| 2009/0318152 A1* | 12/2009 | Maheshwari | 455/436 |
| 2010/0124188 A1* | 5/2010 | Wu | 370/328 |
| 2010/0165836 A1* | 7/2010 | Wahlqvist et al. | 370/225 |
| 2010/0216453 A1* | 8/2010 | Kallin et al. | 455/424 |
| 2010/0240368 A1* | 9/2010 | Fox et al. | 455/435.3 |
| 2010/0267378 A1* | 10/2010 | Hamabe et al. | 455/423 |
| 2010/0273487 A1* | 10/2010 | Alonso-Rubio et al. | 455/436 |
| 2010/0290435 A1* | 11/2010 | Kazmi | 370/332 |
| 2010/0311421 A1* | 12/2010 | Mach | 455/436 |
| 2010/0330994 A1* | 12/2010 | Matsuo et al. | 455/436 |
| 2011/0034177 A1* | 2/2011 | Oh et al. | 455/450 |
| 2011/0159901 A1* | 6/2011 | Frenger et al. | 455/502 |
| 2011/0170404 A1* | 7/2011 | Nordin | 370/216 |

FOREIGN PATENT DOCUMENTS

| | | |
|---|---|---|
| JP | 2006303925 A | 11/2006 |
| WO | WO2006063309 | 6/2006 |
| WO | WO-2009117443 | 9/2009 |

OTHER PUBLICATIONS

Motorola: "Measurements supporting, minimisation of drive test use cases", 3GPP Draft; R2-093208 Measurements Supporting Minimisation of Drive Test Use Cases (2), 3rd Generation Partnership Project (3GPP), Mobile Competence Centre ; 650, Route Des Lucioles ; F-06921 Sophia-Antipolis Cedex ; France, No. San Francisco, USA; 20090428, Apr. 28, 2009, XP050340913, [retrieved on Apr. 28, 2009].

Nec et al: "UE assistance for , self-optimizing of network" , 3GPP Draft; R2-072432, 3rd Generation , Partnership Project (3GPP), Mobile , Competence Centre ; 650, Route Des , Lucioles ; F-06921 Sophia-Antipolis Cedex , ; France,vol. RAN WG2, No. Orlando, USA; 20070622, Jun. 22, 2007, XP050135267 [retrieved on Jun. 22, 2007].

Partial International Search Report—PCT/US2010/039505—International Search Authority, European Patent Office, Oct. 14, 2010.

Qualcomm Europe et al: "Text proposal for , UE Measurements for Minimizing Drive , Tests" , 3GPP Draft; R2-093175, 3rd Generation , Partnership Project (3GPP), Mobile, Competence Centre ; 650, Route Des , Lucioles ; F-06921 Sophia-Antipolis Cedex ; France, No. San Francisco, USA; 20090428, Apr. 28, 2009, XP050340887 [retrieved on Apr. 28, 2009].

Qualcomm Europe: "Automatic Measurement Collection for RF optimization" 3GPP Draft; R3-072118 Automatic Measurement Collection for RF Optimization, 3rd Generation Partnership Project (3GPP), Mobile Competence Centre ; 650, Route Des Lucioles ; F-06921. Sophia-Antipolis Cedex ; France, vol. RAN WG3, No. Jeju Island; 20071105, Oct. 29, 2007, XP050162906 p. 1, paragraph 2-p. 3, paragraph 2.3; figure 1.

Qualcomm Europe: "Framework for UE SON Reports" 3GPP TSG RAN WG3 & SA WG5 Jan. 7, 2009, XP002588155 Retrieved from the Internet: URL:http://www.3gpp.org/ftp/tsg_s a/wg5_tm/ Ad-hocjneetings/2009-01-RAN3/Docs/ [retrieved on Jun. 21, 2010].

Teliasonera, et al., "Necessary measurements for minimising drive tests", 3GPP Draft; R2-092820 Necessary Measurements for Minimising Drive Tests, 3rd Generation Partnership Project (3GPP), Mobile Competence Centre ; 650, Route Des Lucioles ; F-06921 Sophia-Antipolis Cedex ; France, No. San Francisco, USA; 20090427, Apr. 27, 2009, XP050340653, [retrieved on Apr. 27, 2009].

Catt, Derivation of Functions for CCO, 3GPP TSG-RAN WG3 Meeting #64, R3-091240, Apr. 29, 2009, 9 pages.

Catt., SON-Paging load measurement,3GPP TSG-RAN WG2#61bis,3GPP, Apr. 4, 2008,R2-081671, pp. 1-2.

Huawei., SON overview in LTE-A,3GPP TSG-RAN WG3#63bis,3GPP, Mar. 26, 2009,R3-090811.

Huawei., Telecom Italia,Mobility Load Balancing Optimization Use Case,3GPP TSG-RAN WG3#59,3GPP, Feb. 15, 2008,R3-080458.

Taiwan Search Report—TW099120311—TIPO—May 9, 2014.

3GPP: "Framework for UE SON Reports", 3GPP TSG RAN WG3 & SA WG5, S5-090017, Jan. 7, 2009, pp. 1-5, http://www.3gpp.ors/ftp/ tsg_sa/wg5_tm/Ad-hoc_meetings/2009-01-RAN3/Docs/.

\* cited by examiner

METHOD AND APPARATUS FOR NETWORK OPTIMIZATION USING SON SOLUTIONS

CROSS-REFERENCE TO RELATED APPLICATION(S)

This application claims the benefit of U.S. Provisional Patent Application No. 61/219,224, entitled "Drive Test Optimization for SON Solution," filed on Jun. 22, 2009, which is expressly incorporated by reference herein in its entirety.

BACKGROUND

1. Field

The present disclosure relates generally to communication systems, and more particularly, to techniques for network management and optimization.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method for wireless communication includes detecting a communication event, analyzing one or more aspects of the detected communication event, and storing at least one of the one or more aspects of the detected communication event on a user equipment (UE) in a log.

According to another aspect, an apparatus for wireless communication includes means for detecting a communication event, means for analyzing one or more aspects of the detected communication event, and means for storing at least one of the one or more aspects of the detected communication event on an UE in a log.

According to another aspect, a computer program product includes a computer-readable medium comprising code for detecting a communication event analyzing one or more aspects of the detected communication event, and storing at least one of the one or more aspects of the detected communication event on an UE in a log.

According to another aspect, an apparatus for wireless communication includes, at least one processor, and a memory coupled to the at least one processor, wherein the at least one processor is configured to detect a communication event, analyze one or more aspects of the detected communication event, and store at least one of the one or more aspects of the detected communication event on a UE in a log.

According to another aspect, a method for wireless communication in a network includes receiving at least a portion of a UE log from an user equipment, wherein the user equipment log comprises one or more aspects of a detected communication event stored on the user equipment, receiving at least a portion of an eNB log from an eNB wherein the eNB log comprises one or more aspects of a second detected communication event stored on the eNB; comparing at least one of the one or more detected communication event stored on the user equipment with at least one of the one or more aspects of a second detected communication event stored on the eNB to determine a optimization criterion; and using the optimization criterion to optimize the network.

According to another aspect, an apparatus for wireless communication includes means for receiving at least a portion of a UE log from a UE, wherein the UE log comprises one or more aspects of a detected communication event stored on the UE, and means for receiving at least a portion of an eNB log from an eNB wherein the eNB log comprises one or more aspects of a second detected communication event stored on the eNB, means for comparing at least one of the one or more detected communication event stored on the UE with at least one of the one or more aspects of a second detected communication event stored on the eNB to determine a optimization criterion; and means for using the optimization criterion to optimize the network.

According to another aspect, a computer program product includes a computer-readable medium comprising code for, receiving at least a portion of a UE log from According to an aspect, a method for wireless communication, comprises: detecting a communication event; analyzing one or more aspects of the detected communication event; and storing at least one of the one or more aspects of the detected communication event on a UE in a log.

According to another aspect, an apparatus for wireless communication, comprises: means for detecting a communication event; means for analyzing one or more aspects of the detected communication event; and means for storing at least one of the one or more aspects of the detected communication event on a UE in a log.

According to another aspect, a computer program product, comprises: a computer-readable medium comprising code for detecting a communication event analyzing one or more aspects of the detected communication event; and storing at least one of the one or more aspects of the detected communication event on a UE in a log.

A UE, wherein the UE log comprises one or more aspects of a detected communication event stored on the UE, and receiving at least a portion of an eNB log from an eNB wherein the eNB log comprises one or more aspects of a second detected communication event stored on the eNB, comparing at least one of the one or more detected communication event stored on the UE with at least one of the one or more aspects of a second detected communication event stored on the eNB to determine a optimization criterion; and using the optimization criterion to optimize the network.

DETAILED DESCRIPTION

Figure 1:
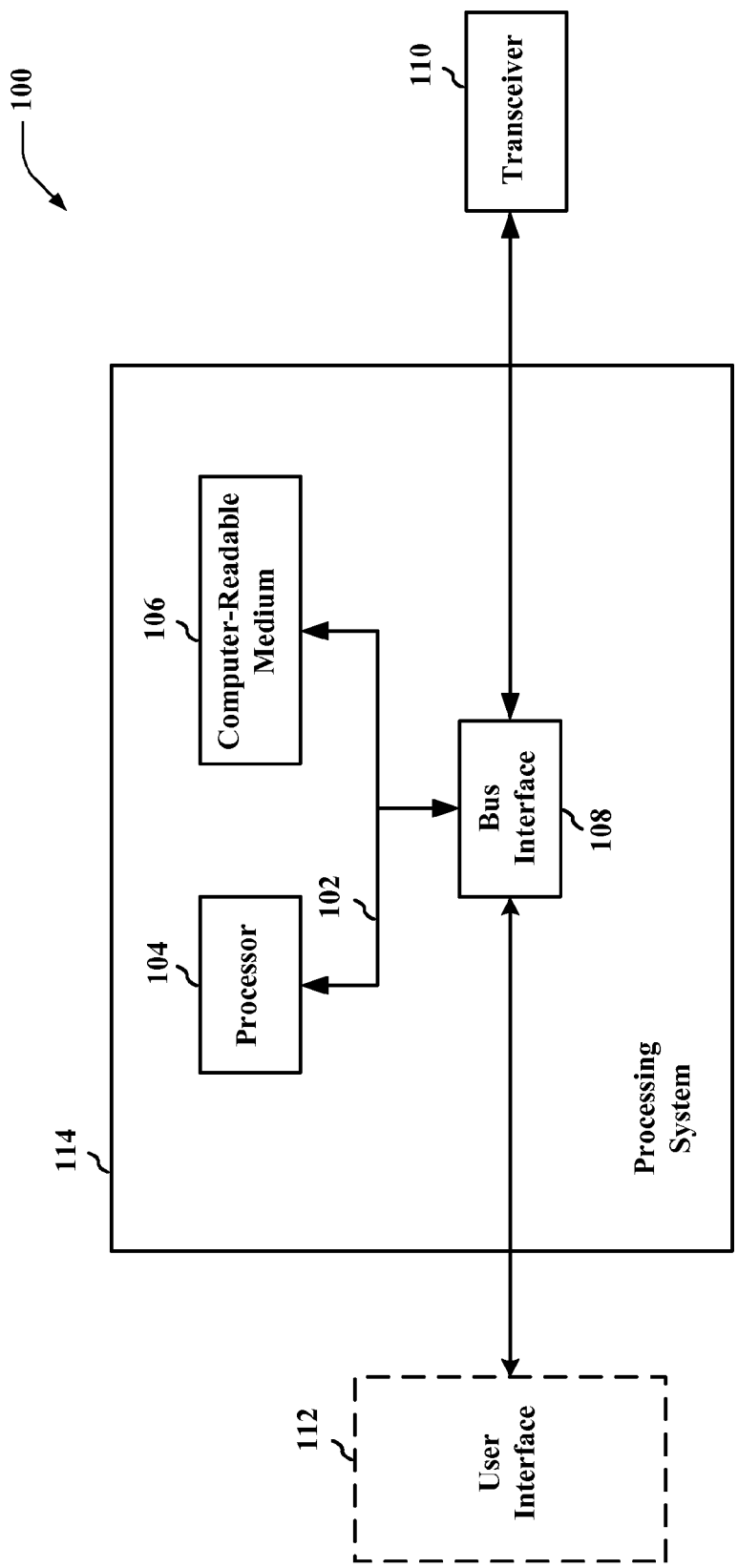
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
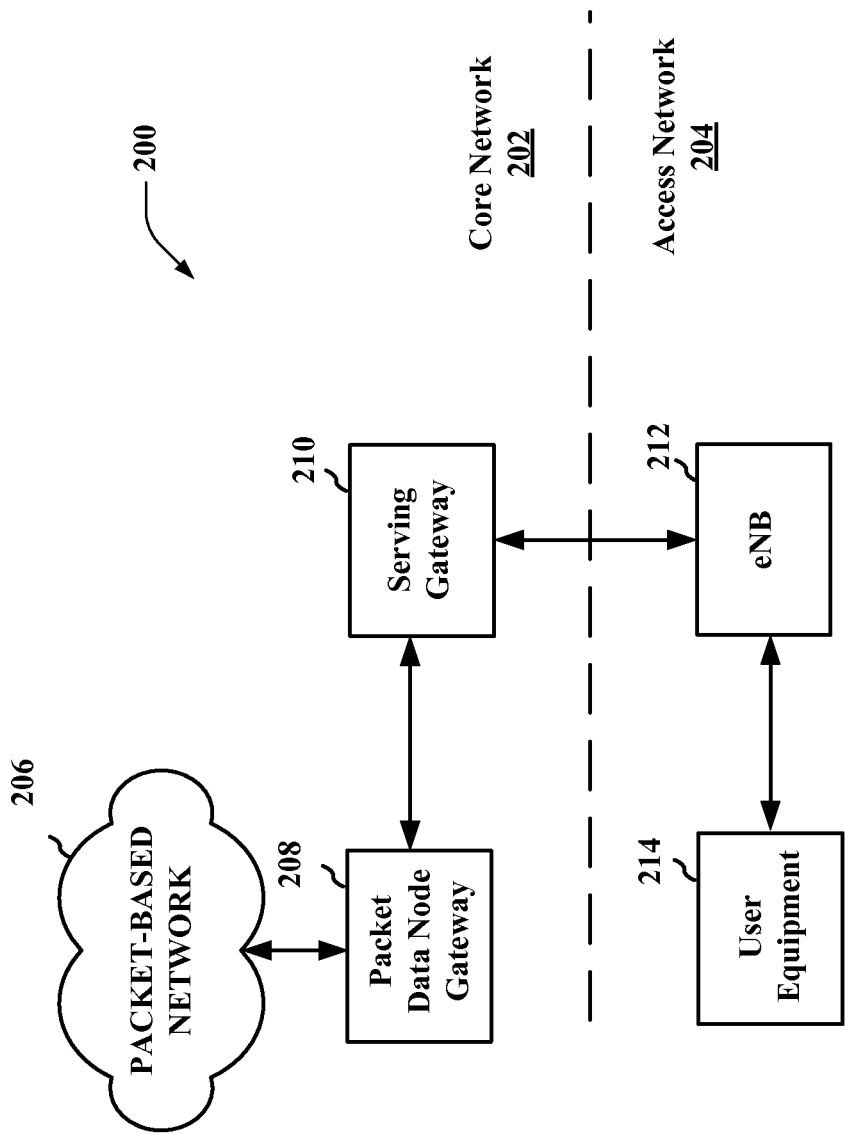
FIG. 2 is a diagram illustrating an example of a network architecture.

An example of a telecommunications system employing various apparatus will now be presented with reference to an LTE network architecture as shown in FIG. 2. The LTE network architecture 200 is shown with a core network 202 and an access network 204. In this example, the core network 202 provides packet-switched services to the access network 204, however, as those skilled in the art will readily appreciate, the various concepts presented throughout this disclosure may be extended to core networks providing circuit-switched services.

The access network 204 is shown with a single apparatus 212, which is commonly referred to as an evolved NodeB in LTE applications, but may also be referred to by those skilled in the art as a base station, a base transceiver station, a radio base station, a radio transceiver, a transceiver function, a basic service set (BSS), an extended service set (ESS), or some other suitable terminology. The eNB 212 provides an access point to the core network 202 for a mobile apparatus 214. Examples of a mobile apparatus include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The mobile apparatus 214 is commonly referred to as UE in LTE applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The core network 202 is shown with several apparatus including a packet data node (PDN) gateway 208 and a serving gateway 210. The PDN gateway 208 provides a connection for the access network 204 to a packet-based network 206. In this example, the packet-based network 206 is the Internet, but the concepts presented throughout this disclosure are not limited to Internet applications. The primary function of the PDN gateway 208 is to provide the UE 214 with network connectivity. Data packets are transferred between the PDN gateway 208 and the UE 214 through the serving gateway 210, which serves as the local mobility anchor as the UE 214 roams through the access network 204.

Figure 3:
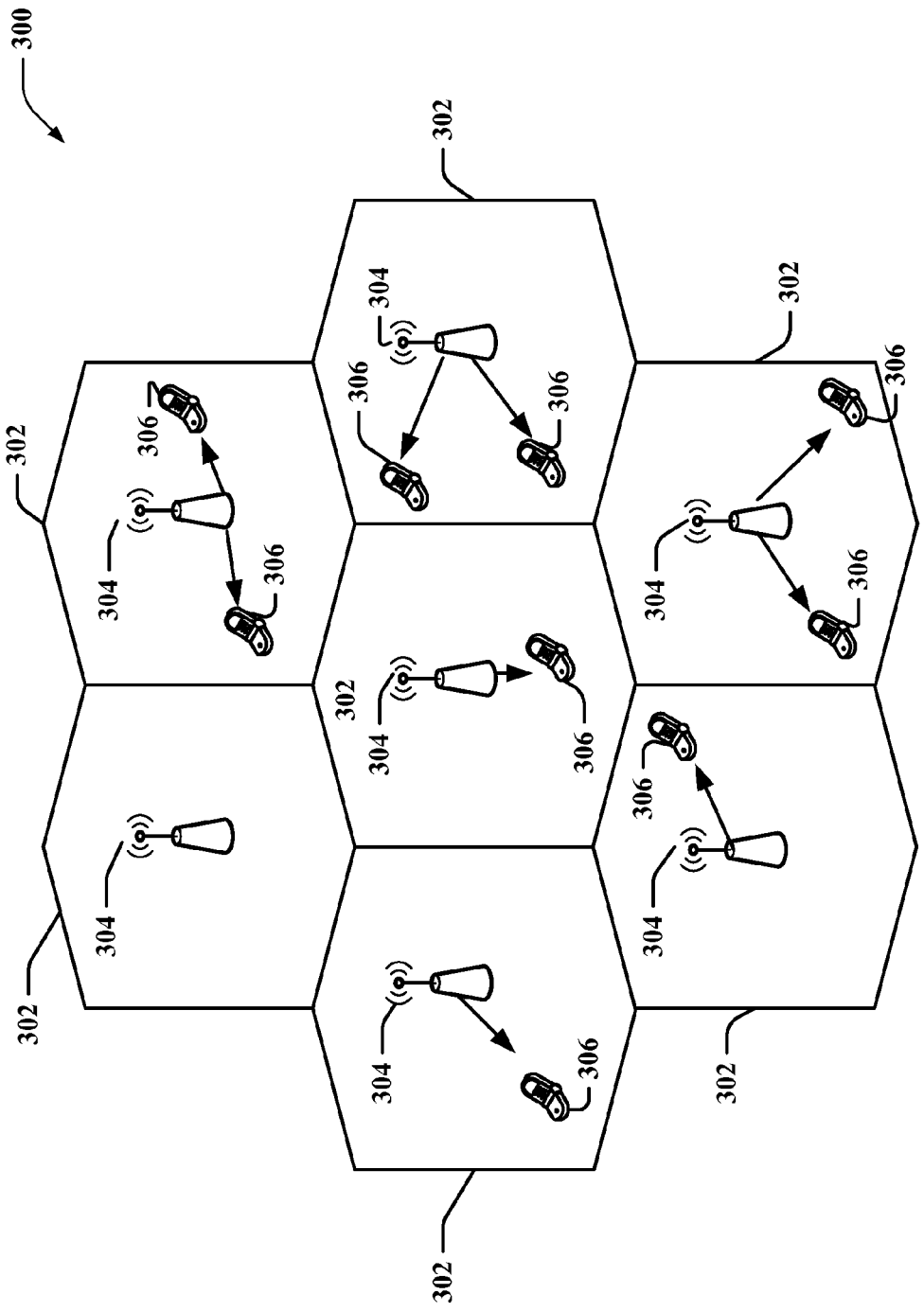
FIG. 3 is a diagram illustrating an example of an access network.

An example of an access network in an LTE network architecture will now be presented with reference to FIG. 3. In this example, the access network 300 is divided into a number of cellular regions (cells) 302. An eNB 304 is assigned to a cell 302 and is configured to provide an access point to a core network 202 (see FIG. 2) for all the UEs 306 in the cell 302. There is no centralized controller in this example of an access network 300, but a centralized controller may be used in alternative configurations. The eNB 304 is responsible for all radio related functions including radio bearer control, admission control, mobility control, scheduling, security, and connectivity to the serving gateway 210 in the core network 202 (see FIG. 2).

The modulation and multiple access scheme employed by the access network 300 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNB 304 may have multiple antennas supporting MIMO technology. The use of MIMO technology enables the eNB 304 to exploit the spatial domain to support spatial multiplexing, beamforming, and transmit diversity.

Spatial multiplexing may be used to transmit different streams of data simultaneously on the same frequency. The data steams may be transmitted to a single UE 306 to increase the data rate or to multiple UEs 306 to increase the overall system capacity. This is achieved by spatially precoding each data stream and then transmitting each spatially precoded stream through a different transmit antenna on the downlink. The spatially precoded data streams arrive at the UE(s) 306 with different spatial signatures, which enables each of the UE(s) 306 to recover the one or more the data streams destined for that UE 306. On the uplink, each UE 306 transmits a spatially precoded data stream, which enables the eNB 304 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PARR).

Figure 4:
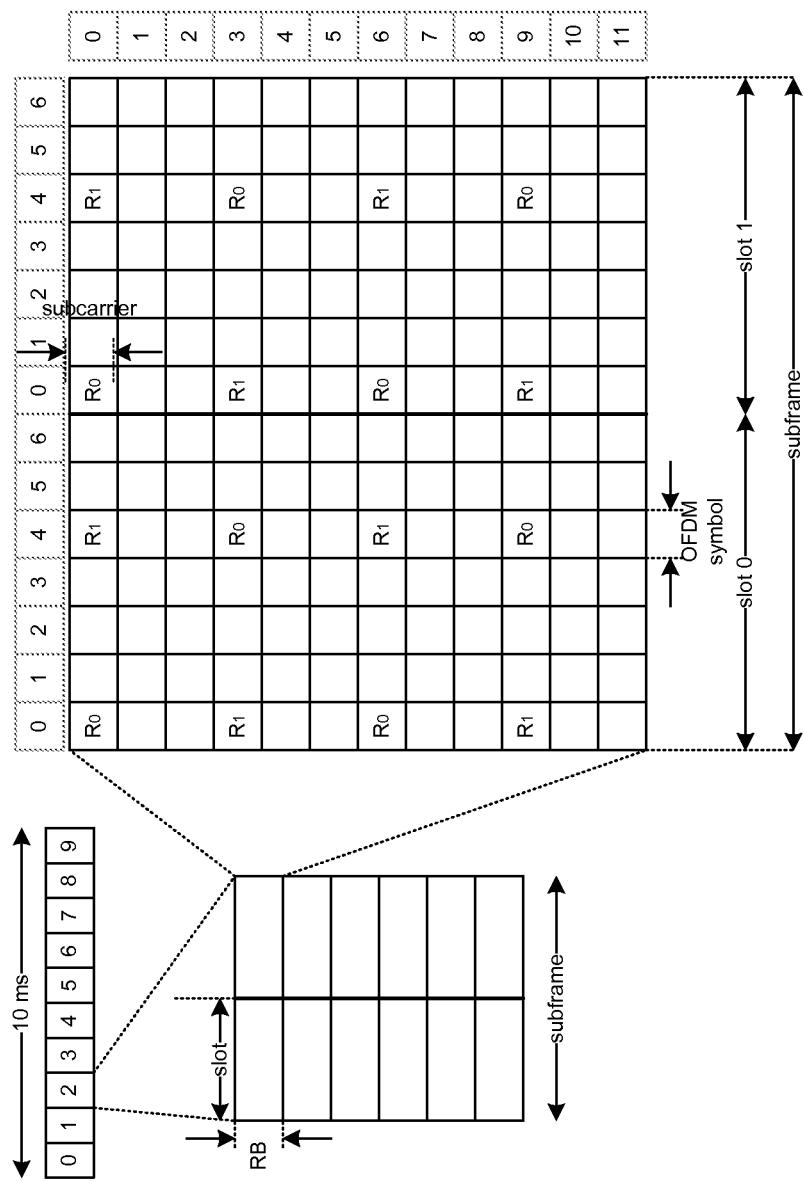
FIG. 4 is a diagram illustrating an example of a frame structure for use in an access network.

Various frame structures may be used to support the DL and UL transmissions. An example of a DL frame structure will now be presented with reference to FIG. 4. However, as those skilled in the art will readily appreciate, the frame structure for any particular application may be different depending on any number of factors. In this example, a frame (10 ms) is divided into 10 equally sized sub-frames. Each sub-frame includes two consecutive time slots.

A resource grid may be used to represent two time slots, each two time slots including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. Some of the resource elements, as indicated as $R_0$ and $R_1$, include a DL reference signal (DL-RS). The DL-RS include Cell-specific RS (CRS) (also sometimes called common RS) and UE-specific RS (UE-RS). UE-RS are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 5:
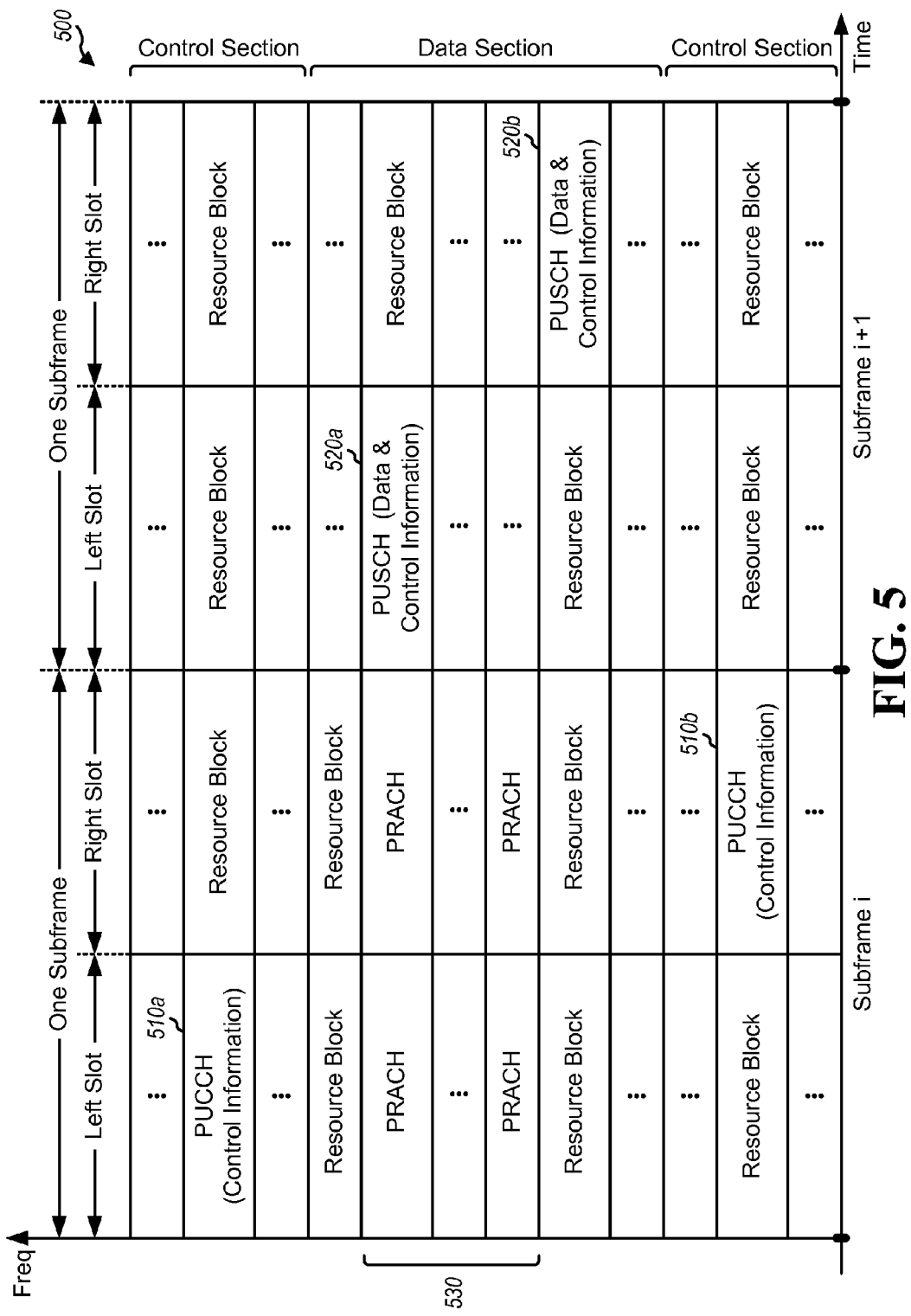
FIG. 5 shows an exemplary format for the UL in LTE.

An example of an UL frame structure will now be presented with reference to FIG. 5. FIG. 5 shows an exemplary format for the UL in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 5 results in the data section including contiguous subcarriers, which may allow a single UE to be assigned all of the contiguous subcarriers in the data section.

A UE may be assigned resource blocks 510a, 510b in the control section to transmit control information to an eNB. The UE may also be assigned resource blocks 520a, 520b in the data section to transmit data to the eNB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An UL transmission may span both slots of a subframe and may hop across frequency as shown in FIG. 5.

As shown in FIG. 5, a set of resource blocks may be used to perform initial system access and achieve UL synchronization in a physical random access channel (PRACH). The PRACH carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for PRACH. The PRACH attempt is carried in a single subframe (1 ms) and a UE can make only a single PRACH attempt per frame (10 ms).

The PUCCH, PUSCH, and PRACH in LTE are described in 3GPP TS 36.211, entitled "Evolved Universal Terrestrial Radio Access (E-UTRA); Physical Channels and Modulation," which is publicly available.

Figure 6:
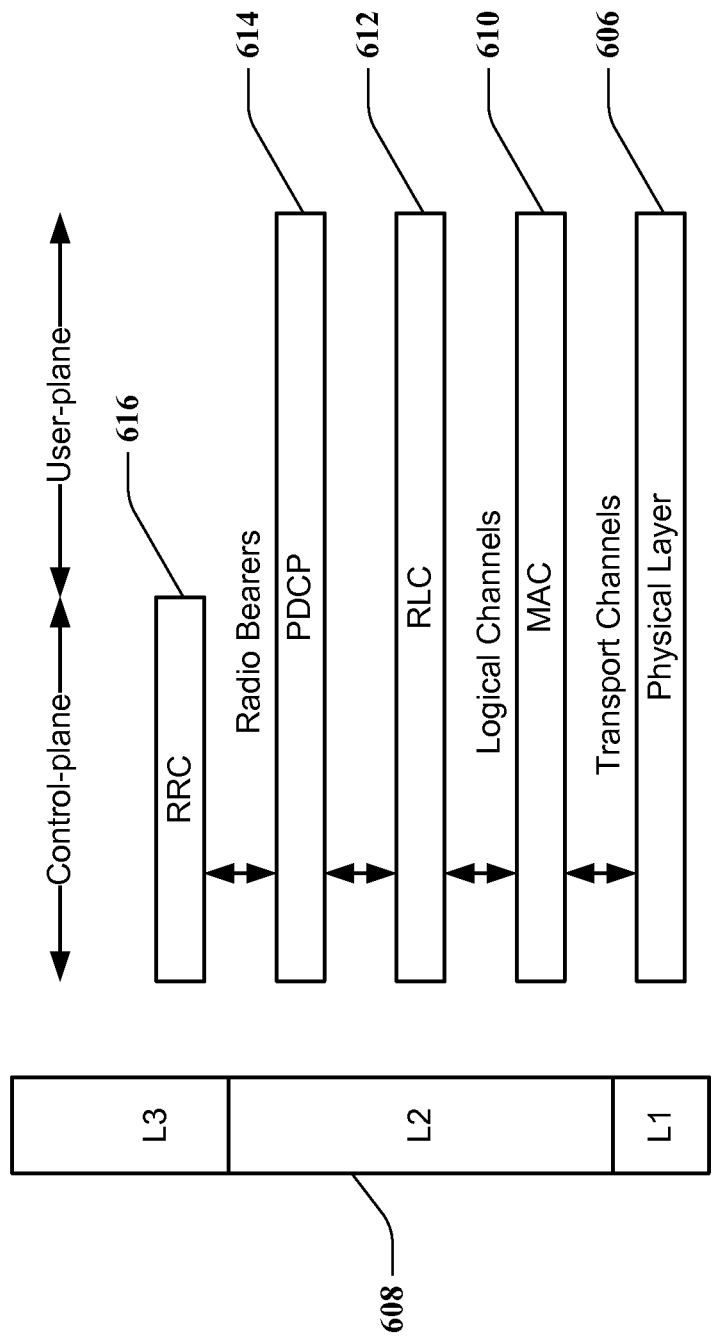
FIG. 6 is a diagram illustrating an example of a radio protocol architecture for the user and control plane.

The radio protocol architecture may take on various forms depending on the particular application. An example for an LTE system will now be presented with reference to FIG. 6. FIG. 6 is a conceptual diagram illustrating an example of the radio protocol architecture for the user and control planes.

Turning to FIG. 6, the radio protocol architecture for the UE and the eNB is shown with three layers: Layer 1, Layer 2, and Layer 3. Layer 1 is the lowest lower and implements various physical layer signal processing functions. Layer 1 will be referred to herein as the physical layer 606. Layer 2 (L2 layer) 608 is above the physical layer 606 and is responsible for the link between the UE and eNB over the physical layer 606.

In the user plane, the L2 layer 608 includes a media access control (MAC) sublayer 610, a radio link control (RLC) sublayer 612, and a packet data convergence protocol (PDCP) 614 sublayer, which are terminated at the eNB on the network side. Although not shown, the UE may have several upper layers above the L2 layer 608 including a network layer (e.g., IP layer) that is terminated at the PDN gateway 208 (see FIG. 2) on the network side, and an application layer that is terminated at the other end of the connection (e.g., far end UE, server, etc.).

The PDCP sublayer 614 provides multiplexing between different radio bearers and logical channels. The PDCP sublayer 614 also provides header compression for upper layer data packets to reduce radio transmission overhead, security by ciphering the data packets, and handover failure, cell reselection failure, cell redirection failure, or out-of-service experience support for UEs between eNBs. The RLC sublayer 612 provides segmentation and reassembly of upper layer data packets, retransmission of lost data packets, and reordering of data packets to compensate for out-of-order reception due to hybrid automatic repeat request (HARQ). The MAC sublayer 610 provides multiplexing between logical and transport channels. The MAC sublayer 610 is also responsible for allocating the various radio resources (e.g., resource blocks) in one cell among the UEs. The MAC sublayer 610 is also responsible for HARQ operations.

In the control plane, the radio protocol architecture for the UE and eNB is substantially the same for the physical layer 606 and the L2 layer 608 with the exception that there is no header compression function for the control plane. The control plane also includes a radio resource control (RRC) sublayer 616 in Layer 3. The RRC sublayer 616 is responsible for obtaining radio resources (i.e., radio bearers) and for configuring the lower layers using RRC signaling between the eNB and the UE.

Figure 7:
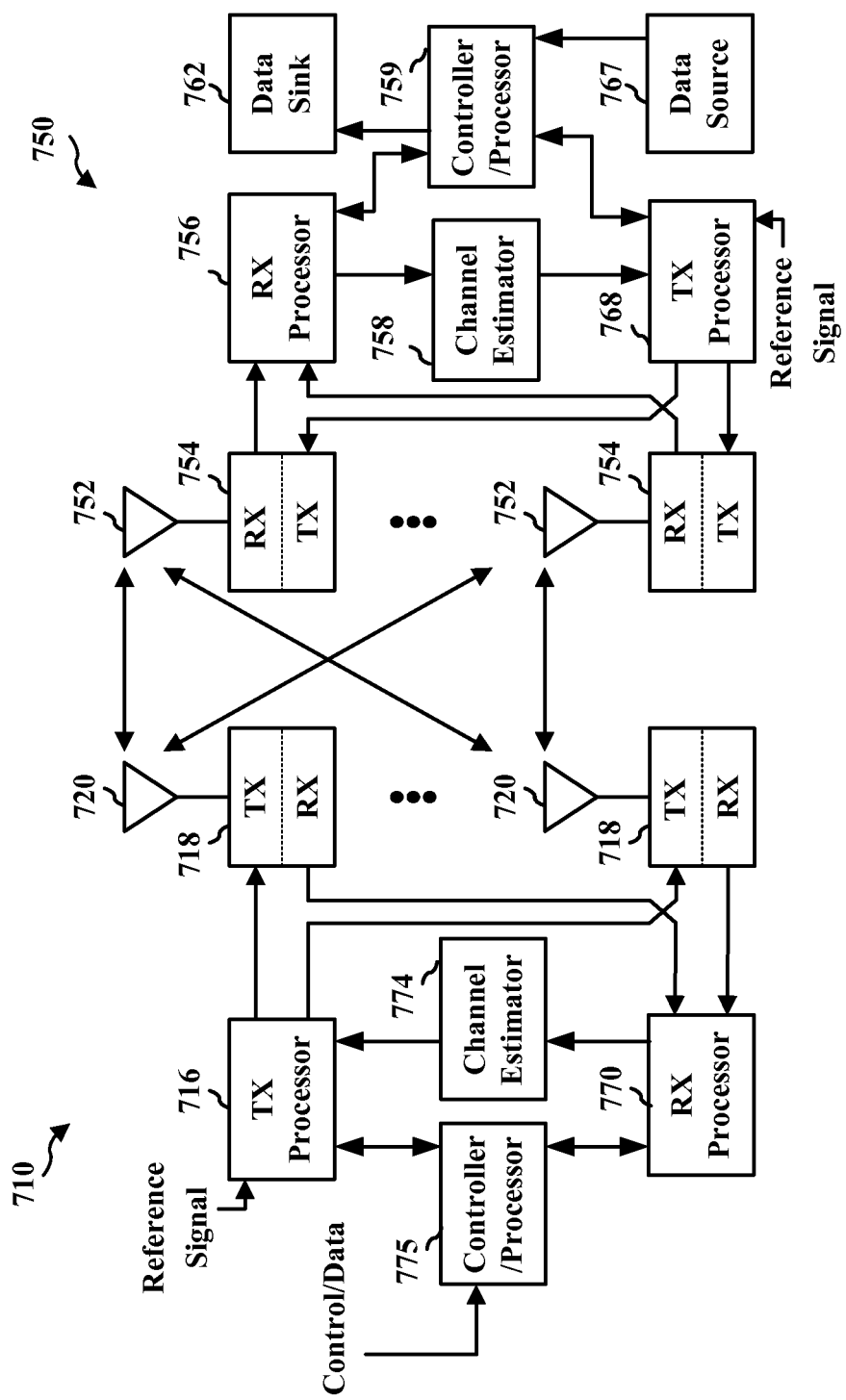
FIG. 7 is a diagram illustrating an example of an eNB and UE in an access network.

FIG. 7 is a block diagram of an eNB 710 in communication with a UE 750 in an access network. In the DL, upper layer packets from the core network are provided to a controller/processor 775. The controller/processor 775 implements the functionality of the L2 layer described earlier in connection with FIG. 6. In the DL, the controller/processor 775 provides header compression, ciphering, packet segmentation and reordering, multiplexing between logical and transport channels, and radio resource allocations to the UE 750 based on various priority metrics. The controller/processor 775 is also responsible for HARQ operations, retransmission of lost packets, and signaling to the UE 750.

The TX processor 716 implements various signal processing functions for the L1 layer (i.e., physical layer). The signal processing functions includes coding and interleaving to facilitate forward error correction (FEC) at the UE 750 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 774 may be used to determine the coding and modulation scheme, as well as for spatial processing. The channel estimate may be derived from a reference signal and/or channel condition feedback transmitted by the UE 750. Each spatial stream is then provided to a different antenna 720 via a separate transmitter 718TX. Each transmitter 718TX modulates an RF carrier with a respective spatial stream for transmission.

At the UE 750, each receiver 754RX receives a signal through its respective antenna 752. Each receiver 754RX recovers information modulated onto an RF carrier and provides the information to the receiver (RX) processor 756.

The RX processor 756 implements various signal processing functions of the L1 layer. The RX processor 756 performs spatial processing on the information to recover any spatial streams destined for the UE 750. If multiple spatial streams are destined for the UE 750, they may be combined by the RX processor 756 into a single OFDM symbol stream. The RX processor 756 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 710. These soft decisions may be based on channel estimates computed by the channel estimator 758. The soft decisions are then decoded and deinterleaved to recover the data and control signals that were originally transmitted by the eNB 710 on the physical channel. The data and control signals are then provided to the controller/processor 759.

The controller/processor 759 implements the L2 layer described earlier in connection with FIG. 5. In the UL, the control/processor 759 provides demultiplexing between transport and logical channels, packet reassembly, deciphering, header decompression, control signal processing to recover upper layer packets from the core network. The upper layer packets are then provided to a data sink 762, which represents all the protocol layers above the L2 layer. Various control signals may also be provided to the data sink 762 for L3 processing. The controller/processor 759 is also responsible for error detection using an acknowledgement (ACK) and/or negative acknowledgement (NACK) protocol to support HARQ operations.

In the UL, a data source 767 is used to provide upper layer packets to the controller/processor 759. The data source 767 represents all protocol layers above the L2 layer (L2). Similar to the functionality described in connection with the DL transmission by the eNB 710, the controller/processor 759 implements the L2 layer for the user plane and the control plane by providing header compression, ciphering, packet segmentation and reordering, and multiplexing between logical and transport channels based on radio resource allocations by the eNB 710. The controller/processor 759 is also responsible for HARQ operations, retransmission of lost packets, and signaling to the eNB 710.

Channel estimates derived by a channel estimator 758 from a reference signal or feedback transmitted by the eNB 710 may be used by the TX processor 768 to select the appropriate coding and modulation schemes, and to facilitate spatial processing. The spatial streams generated by the TX processor 768 are provided to different antenna 752 via separate transmitters 754TX. Each transmitter 754TX modulates an RF carrier with a respective spatial stream for transmission.

The UL transmission is processed at the eNB 710 in a manner similar to that described in connection with the receiver function at the UE 750. Each receiver 718RX receives a signal through its respective antenna 720. Each receiver 718RX recovers information modulated onto an RF carrier and provides the information to a RX processor 770. The RX processor 770 implements the L1 layer.

The controller/processor 759 implements the L2 layer described earlier in connection with FIG. 6. In the UL, the control/processor 759 provides demultiplexing between transport and logical channels, packet reassembly, deciphering, header decompression, control signal processing to recover upper layer packets from the UE 750. Upper layer packets from the controller/processor 775 may be provided to the core network. The controller/processor 759 is also responsible for error detection using an ACK and/or NACK protocol to support HARQ operations.

The processing system 100 described in relation to FIG. 1 includes the eNB 710. In particular, the processing system 100 includes the TX processor 716, the RX processor 770, and the controller/processor 775. The processing system 100 described in relation to FIG. 1 alternatively includes the UE 750. In particular, the processing system 100 includes the TX processor 768, the RX processor 756, and the controller/processor 759.

Figure 8:
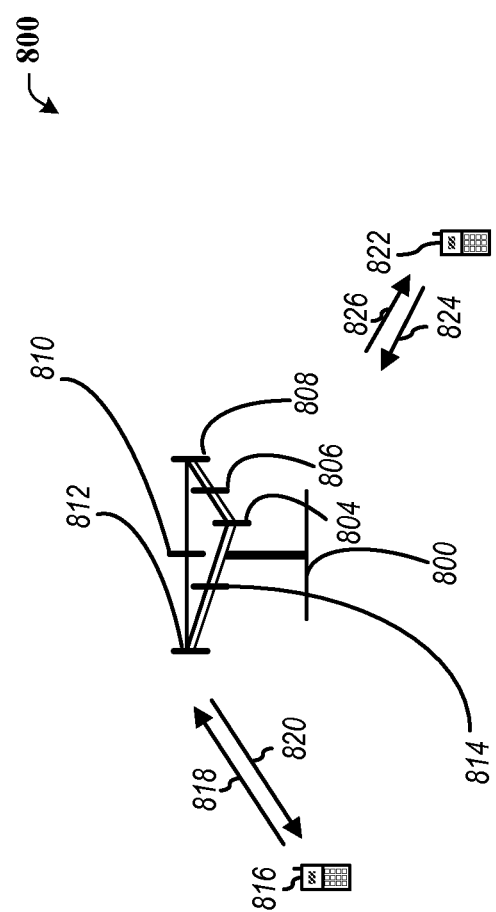
FIG. 8 illustrates an exemplary multiple access wireless communication system according to an aspect.

Referring to FIG. 8, a multiple access wireless communication system according to one aspect is illustrated. An access point 800 (AP) includes multiple antenna groups, one including 804 and 806, another including 808 and 810, and an additional including 812 and 814. In FIG. 8, only two antennas are shown for each antenna group, however, more or fewer antennas may be utilized for each antenna group. Access terminal 816 (AT) is in communication with antennas 812 and 814, where antennas 812 and 814 transmit information to access terminal 816 over forward link 820 and receive information from access terminal 816 over reverse link 818. Access terminal 822 is in communication with antennas 806 and 808, where antennas 806 and 808 transmit information to access terminal 822 over forward link 826 and receive information from access terminal 822 over reverse link 824. In a FDD system, communication links 818, 820, 824 and 826 may use different frequency for communication. For example, forward link 820 may use a different frequency then that used by reverse link 818.

Each group of antennas and/or the area in which they are designed to communicate is often referred to as a sector of the access point. In the aspect, antenna groups each are designed to communicate to access terminals in a sector, of the areas covered by access point 800.

In communication over forward links 820 and 826, the transmitting antennas of access point 800 utilize beamforming in order to improve the signal-to-noise ratio of forward links for the different access terminals 816 and 824. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and also may be referred to as an access point, a Node B, or some other terminology. An access terminal may also be called an access terminal, UE, a wireless communication device, terminal, access terminal or some other terminology.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In an aspect, Logical Traffic Channels comprises a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), a Uplink Shared Data Channel (UL-SDCH) and plurality of PHY channels. The PHY channels comprise a set of DL channels and UL channels.

The DL PHY channels may comprise:
  Common Pilot Channel (CPICH)
  Synchronization Channel (SCH)
  Common Control Channel (CCCH)
  Shared DL Control Channel (SDCCH)
  Multicast Control Channel (MCCH)
  Shared UL Assignment Channel (SUACH)
  Acknowledgement Channel (ACKCH)
  DL Physical Shared Data Channel (DL-PSDCH)
  UL Power Control Channel (UPCCH)
  Paging Indicator Channel (PICH)
  Load Indicator Channel (LICH)
  The UL PHY Channels comprises:
  Physical Random Access Channel (PRACH)
  Channel Quality Indicator Channel (CQICH)
  Acknowledgement Channel (ACKCH)
  Antenna Subset Indicator Channel (ASICH)
  Shared Request Channel (SREQCH)
  UL Physical Shared Data Channel (UL-PSDCH)
  Broadband Pilot Channel (BPICH)

In an aspect, a channel structure is provided that preserves low PAR (at any given time, the channel is contiguous or uniformly spaced in frequency) properties of a single carrier waveform.

Figure 9:
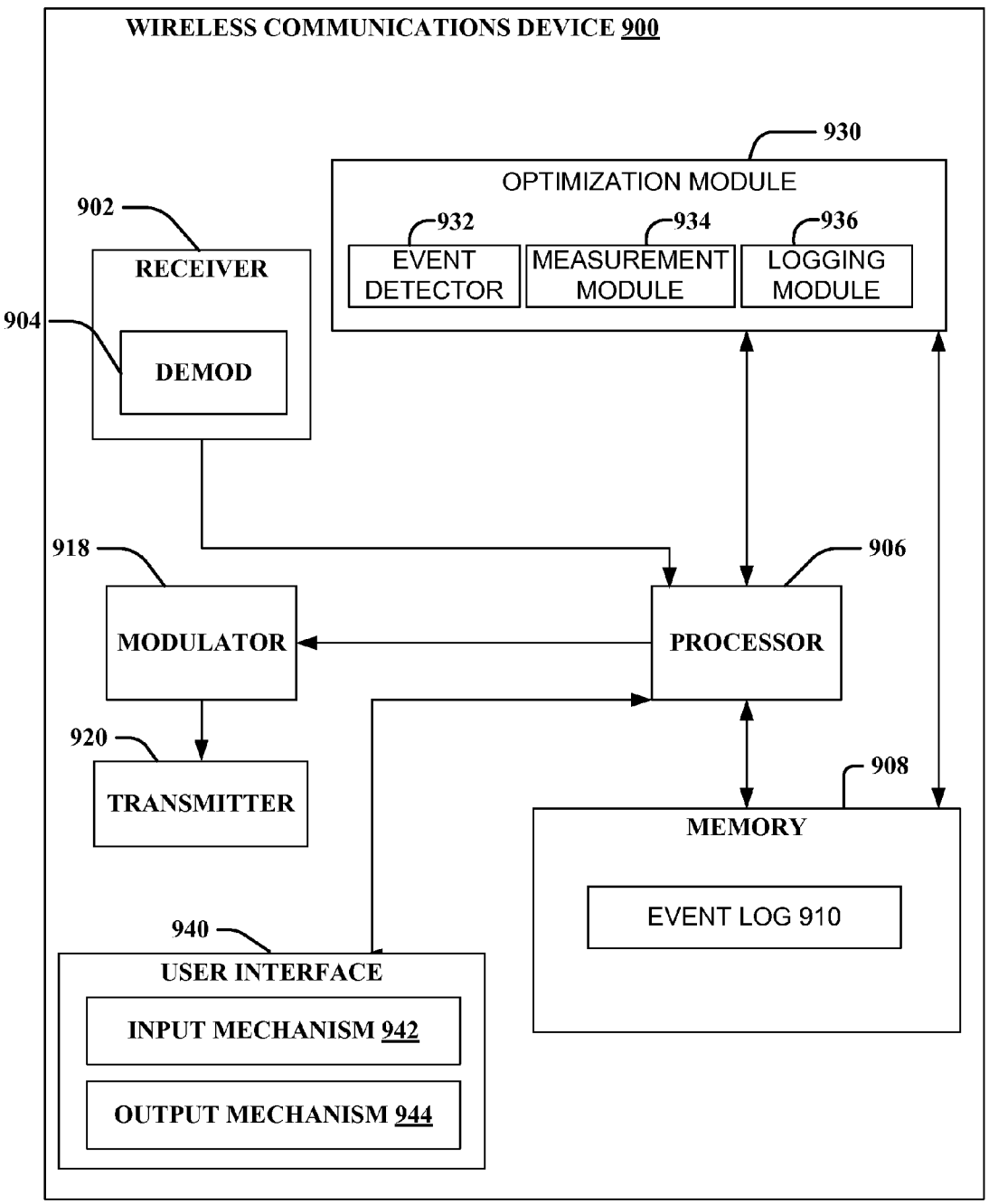
FIG. 9 illustrates a block diagram example architecture of a wireless communications device.

For the purposes of the present document, the following abbreviations may apply:
  AM Acknowledged Mode
  AMD Acknowledged Mode Data
  ARQ Automatic Repeat Request
  BCCH Broadcast Control CHannel
  BCH Broadcast CHannel
  C- Control-
  CCCH Common Control CHannel
  CCH Control CHannel
  CCTrCH Coded Composite Transport Channel
  CP Cyclic Prefix
  CRC Cyclic Redundancy Check
  CTCH Common Traffic CHannel
  DCCH Dedicated Control CHannel
  DCH Dedicated CHannel
  DL DownLink
  DSCH Downlink Shared CHannel
  DTCH Dedicated Traffic CHannel
  FACH Forward link Access CHannel
  FDD Frequency Division Duplex
  L1 Layer 1 (physical layer)
  L2 Layer 2 (data link layer)
  L3 Layer 3 (network layer)
  LI Length Indicator
  LSB Least Significant Bit
  MAC Medium Access Control
  MBMS Multimedia Broadcast Multicast Service
  MCCH MBMS point-to-multipoint Control CHannel
  MRW Move Receiving Window
  MSB Most Significant Bit
  MSCH MBMS point-to-multipoint Scheduling CHannel
  MTCH MBMS point-to-multipoint Traffic CHannel
  PCCH Paging Control CHannel
  PCH Paging CHannel
  PDU Protocol Data Unit
  PHY PHYsical layer
  PhyCH Physical CHannels
  RACH Random Access CHannel
  RLC Radio Link Control
  RRC Radio Resource Control
  SAP Service Access Point
  SDU Service Data Unit
  SHCCH SHared channel Control CHannel
  SN Sequence Number
  SUFI SUper FIeld
  TCH Traffic CHannel
  TDD Time Division Duplex
  TFI Transport Format Indicator
  TM Transparent Mode
  TMD Transparent Mode Data
  TTI Transmission Time Interval
  U—User—
  UE User Equipment
  UL UpLink
  UM Unacknowledged Mode
  UMD Unacknowledged Mode Data
  UMTS Universal Mobile Telecommunications System
  UTRA UMTS Terrestrial Radio Access
  UTRAN UMTS Terrestrial Radio Access Network
  MBSFN multicast broadcast single frequency network
  MCE MBMS coordinating entity
  MCH multicast channel
  DL-SCH downlink shared channel
  MSCH MBMS control channel
  PDCCH physical downlink control channel
  PDSCH physical downlink shared channel Turning now to FIG. 9, an example architecture of UE 900 is illustrated. As depicted in FIG. 9, UE 900 comprises receiver 902 that receives a signal from, for instance, a receive antenna (not shown), performs typical actions on (e.g., filters, amplifies, downconverts, etc.) the received signal, and digitizes the conditioned signal to obtain samples. Receiver 902 can comprise a demodulator 904 that can demodulate received symbols and provide them to processor 906 for channel estimation. Processor 906 can be a processor dedicated to analyzing information received by receiver 902 and/or generating information for transmission by transmitter 920, a processor that controls one or more components of UE 900, and/or a processor that both analyzes information received by receiver 902, generates information for transmission by transmitter 920, and controls one or more components of UE 900.

UE 900 can further include optimization module 930 to facilitate optimization of the network in conjunction with, for example, a SON server. In one aspect, optimization module 930 may only be operable during high interference conditions. Optimization module 930 may further event detector 932 to assist in detecting communication events, such as, for example, a received page, link imbalance, pilot pollution, cell edge experience, handover failure, cell reselection failure, cell redirection failure, or out-of-service experience as described herein. In one aspect, the optimization module 930 may further include a measurement module 934 for performing measurements related to, for example, communication events detected by the event detector 932. In still another aspect, optimization module 930 may further include a logging module 936 which may log, for example, events detected by the event detector 932 and/or data associated with measurements made by the measurement module 934. The logging module may further compile a log of detected events so that the log, or portions of the log, may be transmitted to a SON server or other entity for use in, among other things, optimization of the network, as described below.

UE 900 can additionally comprise memory 908 that is operatively coupled to processor 906 and that can store data to be transmitted, received data, information related to, for example, data or information generated or processed by the optimization module 930. Memory 908 can additionally store protocols and/or algorithms associated with using the measurement module 934 to acquire or process data. Additionally, the memory 908 may store instructions from a SON server, such as instructions in the form of a SON protocol, for measuring, collecting and logging data using the various modules of the optimization module 930.

Further, processor 906 can provide means for analyzing and processing measurement data acquired by the memory module 934, logs or portions of logs generated by the logging module 936 and/or combinations of the two. Additionally, the processor 906 may process instructions from a SON server, such as instructions in the form of a SON protocol, for measuring, collecting and logging data using the various modules of the optimization module 930.

It will be appreciated that data store (e.g., memory 908) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 908 of the subject systems and methods may comprise, without being limited to, these and any other suitable types of memory.

Additionally, UE 900 may include user interface 940. User interface 940 may include input mechanisms 942 for generating inputs into communications device 900, and output mechanism 942 for generating information for consumption by the user of the UE 900. For example, input mechanism 942 may include a mechanism such as a key or keyboard, a mouse, a touch-screen display, a microphone, etc. Further, for example, output mechanism 944 may include a display, an audio speaker, a haptic feedback mechanism, a Personal Area Network (PAN) transceiver etc. In the illustrated aspects, the output mechanism 944 may include a display operable to present media content that is in image or video format or an audio speaker to present media content that is in an audio format.

Figure 10:
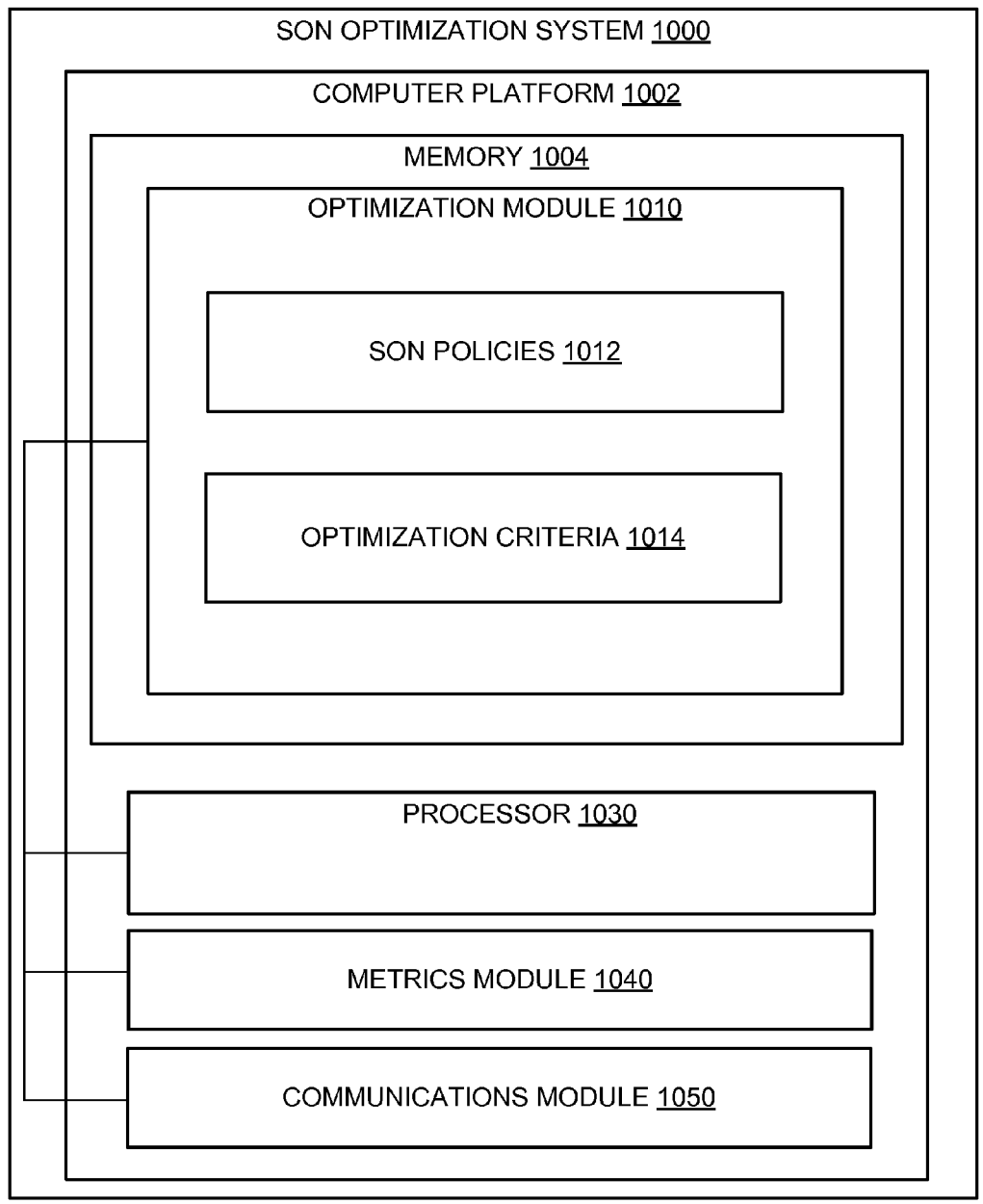
FIG. 10 illustrates exemplary block diagram of interference reduction system according to an aspect.

With reference to FIG. 10, illustrated is a detailed block diagram of SON server optimization system 1000. SON server optimization system 1000 may comprise at least one of any type of hardware, server, personal computer, mini computer, mainframe computer, or any computing device either special purpose or general computing device. Further, the modules and applications described herein as being operated on or executed by SON server optimization system 1000 may be executed entirely on a single network device or alternatively, in other aspects, separate servers, databases or computer devices may work in concert to provide data in usable formats to parties, and/or to provide a separate layer of control in the data flow between communications devices 214 and the modules and applications executed by SON server optimization system 1000.

SON server optimization system 1000 includes computer platform 1002 that can transmit and receive data across wired and wireless networks, and that can execute routines and applications. Computer platform 1002 includes memory 1004, which may comprise volatile and nonvolatile memory such as read-only and/or random-access memory (ROM and RAM), EPROM, EEPROM, flash cards, or any memory common to computer platforms. Further, memory 1004 may include one or more flash memory cells, or may be any secondary or tertiary storage device, such as magnetic media, optical media, tape, or soft or hard disk. Further, computer platform 1002 also includes processor 1030, which may be an application-specific integrated circuit ("ASIC"), or other chipset, logic circuit, or other data processing device. Processor 1030 may include various processing subsystems 1032 embodied in hardware, firmware, software, and combinations thereof, that enable the functionality the SON server and the operability of the network device on a wired or wireless network.

Computer platform 1002 further includes communications module 1050 embodied in hardware, firmware, software, and combinations thereof, that enables communications among the various components of service provider system 1000, as well as between service provider system 1000, devices 214, and eNBs 212. Communication module 1050 may include the requisite hardware, firmware, software and/or combinations thereof for establishing a wireless communication connection. According to described aspects, communication module 1050 may include the necessary hardware, firmware and/or software to facilitate wireless broadcast, multicast and/or unicast communication of requested content items, control information, etc.

Computer platform 1002 further includes metrics module 1040 embodied in hardware, firmware, software, and combinations thereof, that enables metrics received from devices 214, and eNBs 212, etc., corresponding to, among other things, communication event detection, measurement and logging devices 214. In one aspect, SON server optimization system 1000 may analyze data received through metrics module 1040 to modify SON policies and/or other optimization criteria for optimization of the network via the metrics module 1040. The metrics module 1040 may also, for example, compare a log received from devices 214 with a log received from eNBs 212 and/or perform further analysis on data from at least a portion of said logs.

Memory 1004 of SON server optimization system 1000 includes optimization module 1010 operable to facilitate network optimization. In one aspect, optimization module 1010 may include SON policies 1012 and optimization criteria 1014. In one aspect, SON policies 1012 may various means of optimizing network communications and related information including: schemes for revising Neighbor Lists (NL), Neighbor Lists (NL), correlating UE and eNB supplied logs to make intelligent decisions, report issues and make further neighbor list optimization. In one aspect, data control channel schemes 1014 may include orthogonally allocating resources.

Figure 11:
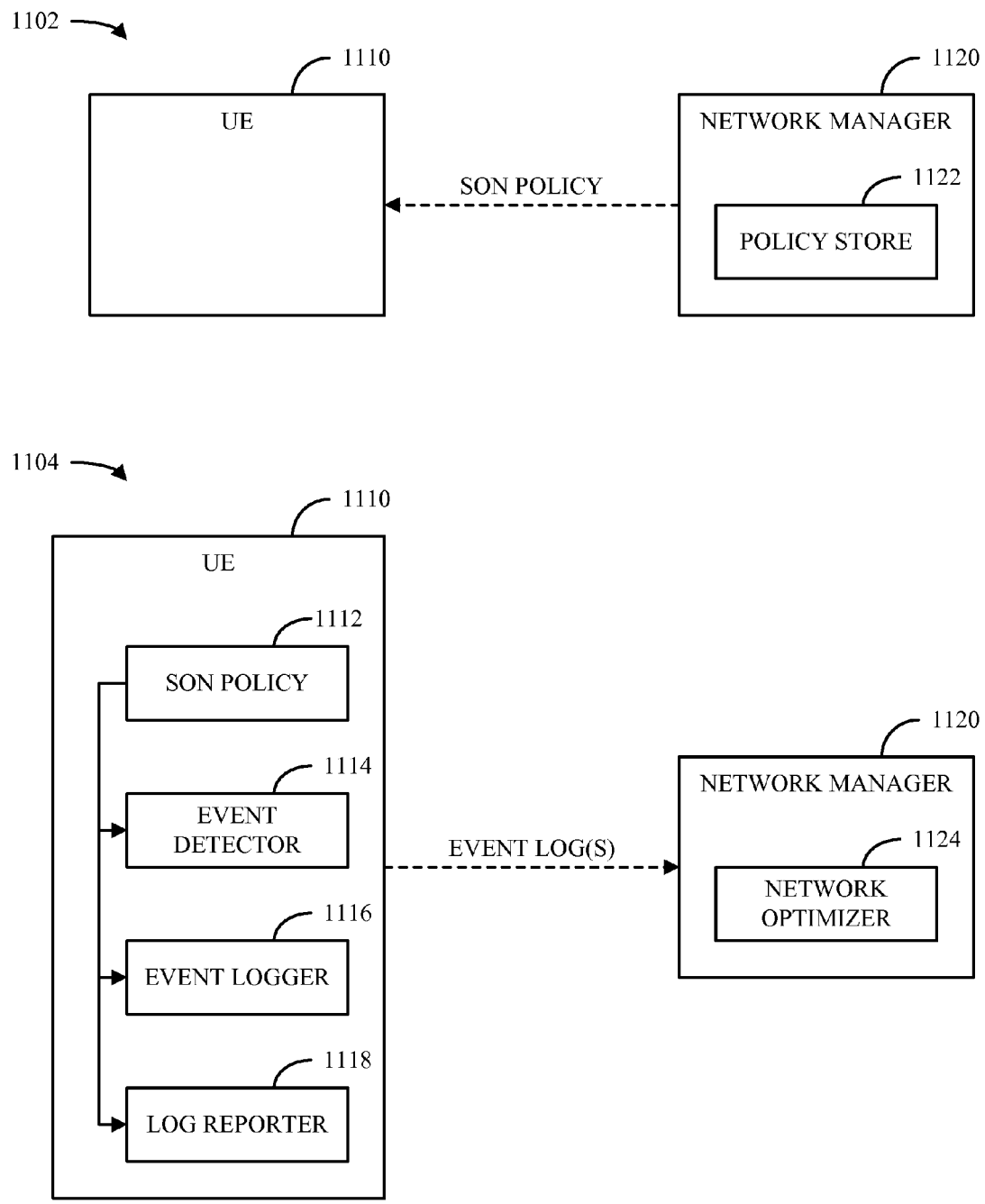
FIG. 11 illustrates block diagrams of a system for managing and optimizing a communication system in accordance with various aspects.

FIG. 11 illustrates block diagrams 1102-1104 of a system for managing and optimizing a communication system in accordance with various aspects provided herein. As diagrams 1102-1104 illustrate, the system can include a UE 1110 and a network manager 1120. While only one UE 1110 and network manager 1120 are illustrated in FIG. 11, it should be appreciated that the system illustrated by diagrams 1102-1104 can include any number of UEs 1110 and/or network managers 1120. It can be further appreciated that network manager 1120 can be any appropriate network entity, such as a Mobility Management Entity (MME), a network controller, a network management server, or the like.

In accordance with one aspect, network manager 1120 can utilize information relating to one or more UEs 1110 in the network to optimize network performance. In conventional communication systems, a network manager would rely on manually obtained and communicated measurements from devices in the network to optimize network performance. These measurements can be obtained through drive testing and/or other manual testing procedures within the network. However, such procedures can be costly and time-consuming, which can render such procedures undesirable and infeasible to implement for a newly deployed network and/or rapidly-changing network.

Accordingly, network manager 1120 as illustrated by FIG. 11 can utilize a Self-Optimized Network (SON) policy to standardize and automate the performance and/or reporting of measurements by UEs 1110, thereby enabling collection of information and/or optimization based on collected information to be conducted in an automatic and autonomous manner. As a result, the need for manual drive testing and other similar manual measurements throughout a communication network can be significantly reduced.

In accordance with one aspect, network manager 1120 can create and/or otherwise identify a SON policy (e.g., a SON policy stored by a policy store 1122) to be used within a network associated with network manager 1120. In one example, the SON policy can specify standardized events to be reported by a UE 1110, techniques for measuring and/or logging such events, techniques for reporting logged events to network manager 1120, or the like. In one aspect, by standardizing the events measured by a UE 1110 and the manner in which such events are logged and reported back to network manager 1120, network manager 1120 can facilitate autonomous management of the network.

In one example, network manager 1120 can provide a UE 1110 in network with a SON policy to be used for detecting, logging, and reporting standardized events as illustrated by diagram 1102. In another example, if UE 1110 is idle prior to being provided with the SON policy, network manager 1120 can initiate paging for UE 1110. Additionally and/or alternatively, UE 1110 can inform network manager 1120 of its capability to support a SON policy (using, for example, a SON bearer and/or an associated network management protocol to be utilized with the SON policy) during an Attach procedure and/or another suitable procedure for establishing a connection between UE 1110 and a network associated with network manager 1120. For example, when UE 1110 is initially attached via GSM EDGE (Enhanced Data rates for GSM Evolution) Radio Access Network (GERAN) and/or UMTS Terrestrial Radio Access Network (UTRAN) then subsequently moves to an Evolved UTRAN (E-UTRAN), UE 1110 can provide an inter-system Tracking Area Update (TAU) message that includes SON-related UE capability information. In accordance with one aspect, a list of UEs 1110 with SON capability can be gathered and maintained by network manager 1120.

After a SON policy 1112 has been provided by network manager 1120 to UE 1110, UE 1110 can operate according to the SON policy 1112 as illustrated by diagram 1104. For example, UE 1110 can include an event detector 1114 to detect the occurrence of one or more standardized events defined in the SON policy 1112, an event logger to log detected events and/or perform corresponding measurements in accordance with the SON policy 1112, a log reporter 1118 to report information relating to detected events to network manager 1120 and/or another suitable entity according to a schedule provided in the SON policy 1112, and/or other appropriate mechanisms for carrying out the SON policy 1112. In accordance with one aspect, network manager 1120 can utilize a network optimizer module 1124 and/or any other appropriate means upon receiving reports of logged events from UE 1110 to optimize the performance of the network based on the received reports without requiring manual testing or measurements.

Figure 12:
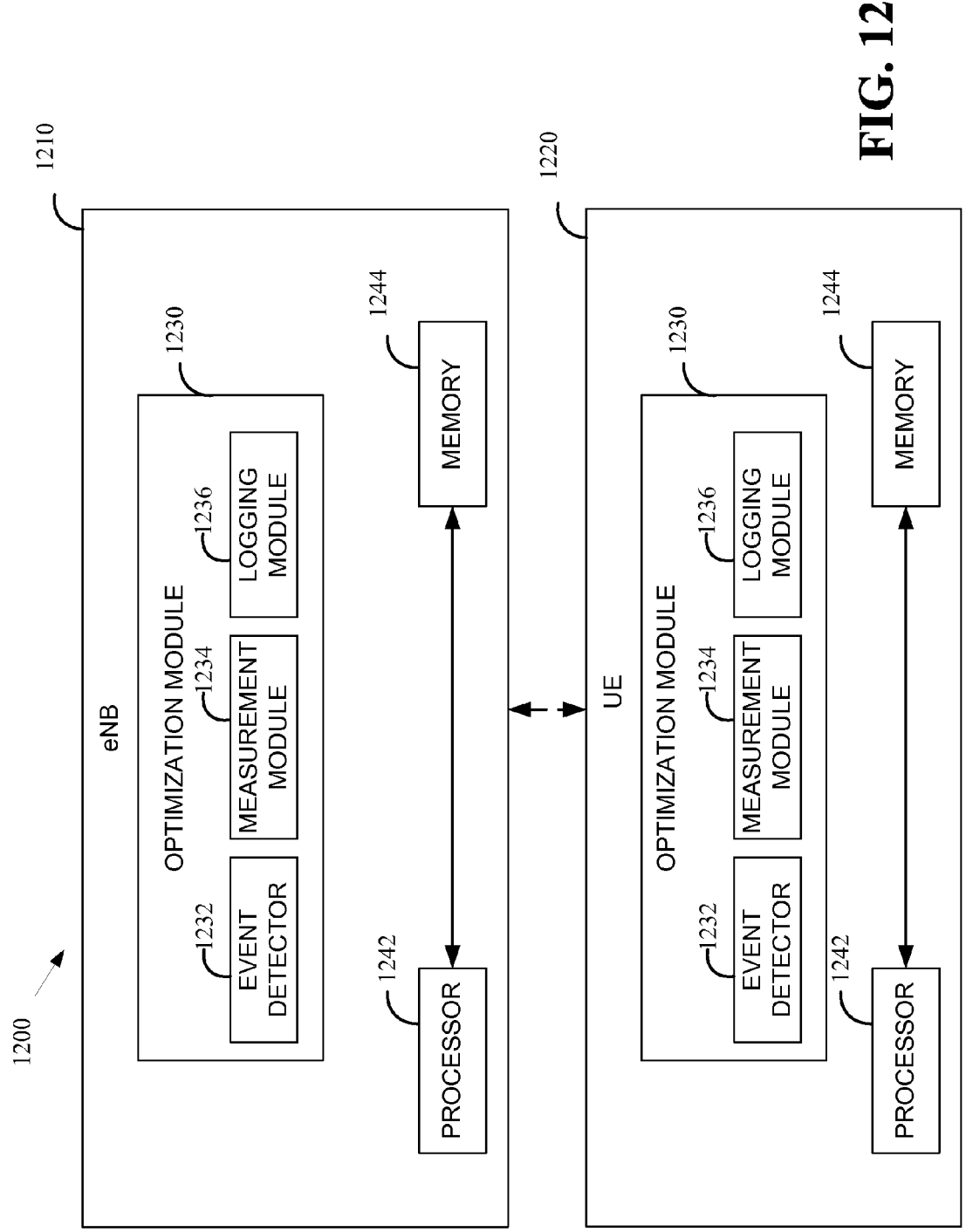
FIGS. 12-13 illustrate example implementations of a Self Optimized Network in accordance with various aspects.

FIG. 12 is a block diagram of a system 1200 for wireless network optimization that may, for example, be used in conjunction with or in alternative to the system in FIG. 11. As FIG. 12 illustrates, the system 1200 can include a UE 1220 and an eNB 1210. While only one UE 1220 and eNB 1210 are illustrated in FIG. 12, it should be appreciated that the system 1200 can include any number of UEs 1220 and/or eNBs 1210. It can be further appreciated that eNB 1210 can be any appropriate network entity, such as a base station, Mobility Management Entity (MME), a network controller, a network management server, or the like.

An eNB 1210 can, for example, transmit data, control signaling and/or other information to the UE 1220. eNB 1210 can also, for example receive data and/or other information to the UE 1220. In addition, eNB 1210 and/or UE 1220 can include a processor 1242 and/or memory 1244 for implementing some or all of the functionality described herein, with respect to eNB 1210, UE 1220, optimization module 1230 and/or any other suitable functionality.

In conventional communication systems, a network manager (not shown) would rely on manually obtained and communicated measurements from devices in the network to optimize network performance. These measurements would typically be obtained through drive testing and/or other manual testing procedures within the network. However, such procedures can be costly and time-consuming, which can render such procedures undesirable and infeasible to implement for a newly deployed network and/or rapidly-changing network.

In accordance with one aspect, eNB 1210 can utilize information relating to one or more UEs 1220 in the network to optimize network performance in conjunction with a SON server (not shown). Data exchange between the UE 1220 and the SON server (not shown) may, for example, take place through a network manager, such as network manager 1120 shown in FIG. 11. Generally, communication of a SON policy to the UE 1220 will take place this way (as shown in FIG. 11, for example).

As illustrated in system 1200, eNB 1210 and/or UE 1220 can include an optimization module 1230 which can, among other things, detect communication events, perform one or more measurements and log at least the results of the measurements. The measurements may be dictated, indicated, selected or directed by a SON protocol and pertain, for example, to a communication event between the UE 1220 and the eNB 1210 or other entity. The measurements will be discussed more specifically below. The optimization module 1230 generally includes functionality for gathering and storing data and other information. The optimization module 1230 may further include the capability to transmit that data to another entity (e.g., from the UE 1220 to the eNB 1210 or vice versa). For each of these capabilities as well as others, the optimization module 1230 generally includes: an event detector 1232, measurement module 1234 and a logging module 1236.

In one aspect, operation of various components of the optimization module may be governed by a SON policy generated by a SON server (not shown). In accordance with one aspect, eNB 1210 can interface directly with a SON server (not shown). In other aspects, UE 1220 may interface directly with a SON server to obtain a SON policy (e.g., as shown in FIG. 11). In one example, the SON policy can specify standardized events to be reported by a UE 1220, techniques for measuring and/or logging such events, techniques for reporting logged events to a network manager, or the like. In one aspect, by standardizing the events measured by a UE 1220 and the manner in which such events are logged and reported back to a network manager, a network manager can facilitate autonomous management of the network.

Operation module 1230 may have an event detector 1232. The function of the event detector 1232 is generally to detect communication events that may be relevant and/or useful to an optimization of the network performed by a SON server. It is to be appreciated that event detector 610 can be associated with a device in a network (e.g., UE 1220 to the eNB 1210), or alternatively event detector 1232 can be a stand-alone entity in a communication network. Accordingly, the functions and functionality of event detectors 1232 may differ according to their locations. For example the functionality of the event detector 1232 on the UE 1220 may differ from the functionality of the event detector 1232 on the eNB 1210.

In one example, events can be defined by a SON policy of the SON server and/or another suitable set of definitions. The event detector 1232 may include any number of suitable features and attributes enabling diagnosis and detection. Detected communication events may include, but are not limited to: detecting missed pages (in the case of the event detector 1232 in the eNB 1210), received pages, a link imbalance, pilot and data pollution, cell edge effects, handover failure, cell reselection failure, cell redirection failure, or out-of-service experience. The event detector 1232 may include separate modules devoted to detecting each type of event, for example. Alternatively, the event detector 1232 may include only one multi-purpose module that is capable of detecting multiple events.

In accordance with other aspects, event detector 1232 can include one or more modules in addition to the above (not shown) for facilitating detection of various types of events in addition to the communication events. For example, event detector 1232 can include a failure detector for detecting failures associated with a network and/or devices in a network, such as radio link failures, connection failures, hardware failures, or the like. As another example, event detector can include a location monitor, which can monitor the location of system 600 and/or an associated device within a network and any changes to the monitored location (e.g., movement of an associated device between cells and/or networks). Event detector can additionally and/or alternatively include an operating state monitor, which can monitor transmission resources (e.g., resources in frequency, code, etc.), transmit power, observed interference, and/or other operation parameters associated with a network device and/or changes to such parameters.

Measurements and actions associated with performing measurements are performed by the measurement module 1234 when one or more of the communication events are detected by the event detector 1232. In other words, the measurement module 1234 generally may perform measurements related to the detection of one or more communication events such as, but not limited to: detecting missed pages, a link imbalance, pilot and data pollution, cell edge effects, handover failure, cell reselection failure, cell redirection failure, or out-of-service experience, etc. For this and other purposes, the measurement module 1234 may have the capability to measure pilot or sounding signals, link power control bits, pilots and the number of pilots, handover failure, cell reselection failure, cell redirection failure, or out-of-service experience events, cell selection/reselection, etc. In addition, the Measurement Module 1234 generally has the capability to record the time and during of the communication events.

Logging module 1236 logs the communication events detected by the event detector 1232 and the data associated with the measurements performed by the measurement module 1234. In particular, the logging module 1236 may include the ability to store data associated with the measurements performed by the measurement module 1234 locally in a log or in another suitable format.

Aspects of events that may be logged by the logging module 1236 include, but are not limited to: which entities are involved in the event (e.g., which links, base stations, etc.) logging, optimization functions described herein, etc.

In one aspect, a missed page may occur may when if the UE 1220 fails to respond to a page from the eNB 1210 serving the UE 1220, or from some other entity. In general, the UE 1220 can be in an idle state, which means it is not connected to a base station or eNB 1201. In this situation, the network may have no knowledge of the actual location or status of the UE 1220. A page may be sent by a network entity in attempt to, among other things, establish communication with the UE 1220. A missed page occurs with the UE 1220, for whatever, reason, fails to respond to such a page. More detailed descriptions of paging and missed page events follow.

If the UE 1220 is idle (e.g., not connected to a base station or eNB 1201), a Mobility Management Entity (MME), a network controller, a network management server, or the like can send a paging message (a "page") to the UE 1200 in order to, among other things, set up a signaling connection for an ENM message exchange. Purposes of the page include communicating with and/or locating the UE 1220. Accordingly, the MME can provide a Paging Request message to an eNB 1210, or a series of eNBs 1210, which may serve the UE 1220 to be paged. The eNBs 1210 receiving the Paging Request message from the MEE then can page the UE 1220. Generally paging is performed by multiple eNBs 1210 in order to locate and/or establish communication with the UE 1220.

If the UE 1220 receives the page, the UE 1220 can respond to the paging signal by connecting to the eNB 1201, sending the page and submitting a Service Request message to the eNB event detector 1232 or to an MME event detector (not shown). In this case, the UE 1220 event detector 1232 would detect a page received event and log it using the logging module 1236, usually with a time stamp indicating when the page was received and/or when the page was sent. The UE 1220 may also log other information such as the identity of the eNB 1201 or eNBs 1210 from which pages were received, the relative strength of the paging signals, etc.

In any given cell, there may be areas where coverage is interrupted or limited such that signals to the UE 1220 from the eNB 1210 or other network entity do have sufficient power to place them in the power range in which the UE is operative. In addition, it may be that UE 1220 is switched off when a page is sent, or in another state in which it cannot receive a page. If a page is sent in one of these or similar situations, the UE 1220 will likely not respond to the page. Such a communication event is called a "missed page."

That is, if the UE 1220 fails to receive the page, for whatever reason, there will generally be no response sent by the UE 1220 to the eNB event detector 1232. Each such missed page will be detected by the eNB 1210 event detector 1232 by, for example, waiting a specified time after a page has been sent. If no response from the UE 1220 is received within the specified time period, a missed page event will be detected by the event detector 1232 of the eNB 1210. In this case the eNB 1210 logging module 1236 will log the missed page, usually with a time stamp relating to missed page (e.g., indicating when the missed page was detected and/or when the page that was missed was sent by the eNB 1210). The eNB 1210 or eNBs 1201 may also log other information such as the identity of the UE 1220 that missed the page, the last known location and status of the UE 1220, the identity of the eNB 1201 or eNBs 1210 from which pages were sent, etc.

A link imbalance may occur when the UE 1220 is a connected state (i.e., is communicating with at least one eNB 1210). Generally, in connected state, the UE 1220 receives communications in uplink and downlink. When the communication from one link has low error and a high data rate while communication from a second link has high error and low data rate a "link imbalance" is said to have occurred. A more detailed descriptions of a link imbalance event follows.

In the connected state, the UE 1220 receives a good signal on downlink from at least one link (e.g., high MCS data rate, high signal to noise ratio (SNR), low CRC or checksum error failure). A link imbalance occurs when, in this situation, the UE 1220 is not receiving a good signal on downlink from at least another link (e.g., high CRC or checksum error failure or SNR). Generally speaking if the CRC or checksum error failure is high, the second link with decrease the MCS data rate. Therefore, a high CRC or checksum failure from the second link can lead to a low MCS data rate.

Link imbalance may occur for a number of reasons. For example, it could be simply be that communication parameters (e.g., channel decoding, etc.) are better optimized for one link than another. Additionally or alternatively, there may be interference issues. For example, the presence of other UEs 1220 may interfere to a larger extent with the ability to of the UE 1220 to communicate with one link than it interferes with the ability of the UE 1220 to communicate with a second link. In fact, other UEs 1220 in the same or neighboring cells may cause communication interference between the UEs 1220 and links to varying degrees and in a way that is geographically heterogeneous.

Such a link imbalance may be monitored by both checking the power of a pilot or sounding signal from the links, the channel quality indictor (CQI) and/or checking the power up/down commands sent by the eNB 1210 to the UE 1220.

For example, if an eNB 1210 is constantly sending a power-up command to the UE 1220 for an extended period of time, it is a good indication that there is a problem with that link, especially if the eNB 1210 is not sending power-up commands consistently to other links. Likewise, if an eNB 1210 is constantly sending a power-down command to the UE 1220 for an extended period of time and the CQI indicates a low channel quality, it is a good indication that there is a problem with that link, especially if the eNB 1210 is not sending power-down commands consistently to other links. Power-up and power-down commands can be monitored via the power control bits on a particular link.

If the eNB 1210 sends a pilot or sounding signal to a UE 1220, it may generally measure and record parameters associated with its measurement module 1234 and logging module 1236, respectively. Such measured and recorded parameters may include, for example, the time of the transmission (time-stamp), identification of the cell in which the UE 1220 is located and the receive power level of the power of the pilot or sounding signal.

The event detector 1232 of the eNB 1210 may compare each measured pilot or sounding signal with logged pilot or sounding signals to determine if a link imbalance has occurred. For example, the event detector 1232 will detect a link imbalance if the following occurs: 1) a pilot or sounding receive power level is below a threshold value Thresh_link for a specified period of time Time_link and 2) a pilot or sounding signal receive power level for a second link is not below Thresh_link for at least Time_link. The parameters Thresh_link and Time_link may be set, for example, by a SON server. Once the eNB 1210 event detector 1232 had detected a link imbalance, it may record the link imbalance by using the logging module 1236 to log parameters such as, for example: the time the link imbalance was detected, the identity of the cell in which the link imbalance occurred, receive power level and the duration of the imbalance.

If the UE 1220 receives a pilot or sounding signal from a link, it may generally measure and record parameters associated with its measurement module 1234 and logging module 1236, respectively. Such measured and recorded parameters may include, for example, the identity of the link from which the pilot or sounding signal was received as well as the power of the pilot or sounding signal from the sending link.

The event detector 1232 of the UE 1220 may compare each measured pilot or sounding signal with logged pilot or sounding signals to determine if a link imbalance has occurred. For example, the event detector 1232 will detect a link imbalance if the following occurs: 1) the power control bits for a particular link indicate either up or down for a specified period of time Time_link and 2) a power control bits for a second link do not indicate the same for at least Time_link. The parameter Time_link may be set, for example, by a SON server. Once the UE 1220 event detector 1232 had detected a link imbalance, it may record the link imbalance by using the logging module 1236 to log parameters such as, for example: the time the link imbalance was detected, the identity of the cell in which the link imbalance occurred, the power level of the link causing the imbalance relative to the power of the second link and the duration of the imbalance.

Generally, pilot and/or data pollution may occur when a UE 1220 is receiving pilot and/or data signals from multiple cells at equal or near equal strength (SINR within a few dB). Pilot pollution and/or data pollution may occur and be detected when the UE 1220 is either in an idle or a connected state (i.e., is communicating with at least one eNB 1210). The pollution generally causes problems in interpreting received data because of interference or overlap between the signals.

Despite the fact that the cell design should be such that only one eNB 1210 dominates a particular cell, it is commonly observed in network deployment that a UE 1220 can "hear" a number of different cells at once. This problem can also occur if the frequency gap between the highest and lowest transmitting base station is insufficient for the signals to be distinguished. In other words, pilot and/or data pollution occurs when the signals from two pilots may interfere with one another. In these situations, there is a need to change the power of the interfering eNB 1210 so that interference is reduced.

Even when a communication link is established between a UE 1220 and a particular eNB 1210 in a particular cell, the UE 1220 will still need to listen to other eNBs 1210 in, for example, neighboring cells. Such neighboring cell eNBs 1210 may transmit, for example, network maintenance or other information to the UE 1220. When neighboring cells are chosen, typically their pilot or sounding signals are shifted in frequency with respect to one another in order to prevent interference. However, there is nevertheless occasional overlap in some systems due to inherent limitations. For example, in modular six communications, there are only six pilots that can be chosen such that none of them overlap in frequency. In such a case, some pilots may overlap in frequency. In these cases time shifts may be applied, for example in order to distinguish the pilots. Nevertheless, in such a situation, there could be interference between the pilot communications to the UE 1220. Such a case is referred to as "pilot pollution." Moreover, data from neighboring cells may be sent on the same frequency and may interfere in a similar manner. Such a case is typically called "data pollution."

In either case, an interference can situation can arise in which the SINR for one eNB 1210 similar to the SINR of the signal from another eNB 1210. After either a pilot or data is sent to the UE 1220, the UE 1220 will send back a channel quality indicator (CQI) for both the pilot and the data. Pilot pollution will cause, for example, successive CRC failures at the UE 1220 when it is in connected mode. In addition, multiple unfavorable CQIs will be received.

A number of methods and parameters may be used to measure pilot and data pollution. Each method relies upon the detection of too many pilots and/or eNBs 1210. Too many detected pilots may be observed by the UE 1220 in either the idle or the connected state. Generally, pilot and data pollution occurs when the UE 1220 detects a number of pilot signals exceeding a threshold number Threshpilot. The parameter Thresh_pilot may be set, for example, by a SON server.

If the UE 1220 receives a pilot or sounding signal from a link, it may generally measure and record parameters associated with its measurement module 1234 and logging module 1236, respectively. Such measured and recorded parameters may include, for example, the identity of the link from which the pilot or sounding signal was received, the power of the pilot or sounding signal from the sending link and the CQI or error rate of the pilot or sounding signal.

The event detector 1232 of the UE 1220 may, for example, simply count the number of links providing pilot or sounding signals. If this number exceeds Thresh_pilot, then a pilot and data pollution event has been detected.

Once the UE 1220 event detector 1232 had detected a pilot and data pollution event, it may record the pilot and data pollution event by using the logging module 1236 to log parameters such as, for example: the time the pilot and data pollution event was detected, the identity of the cell in which the pilot and data pollution event occurred, the pilots that were implicated in the pilot and data pollution event and the power level of the each pilot implicated in the pilot and data pollution event.

A cell edge experience may occur when the UE 1220 has reached the edge of the range of transmission of the cell and the signal of neighboring cells is even lower, so as to prevent handover failure, cell reselection failure, cell redirection failure, or out-of-service experience. Simply put, the signal from the serving cell becomes too weak to reliably transfer data to and from the UE 1220.

Problems that may ensue include the UE 1220 receiving a weak signal from the serving cell as well as interference between the signal of the cell and neighboring cells. This will generally result in a low MRS data right, high level of CRC failure (in the connected state) and a higher possibility of missed pages (in the idle state). Moreover, cell edge experience can be detected when the power of serving cell is below a particular power threshold. In this situation handover failure, cell reselection failure, cell redirection failure, or out-of-service experience is prevented and the UE 1220 may linger in this poorly connected state for some time.

Cell edge experience may be detected when the UE 1220 receives a signal that is below a threshold Thresh_cell for a time Time_cell. The parameters Thresh_cell and Time_cell may be set, for example, by a SON server.

Once the UE 1220 event detector 1232 had detected a cell edge experience, it may record the cell edge experience by using the logging module 1236 to log parameters such as, for example: the time the cell edge experience was detected, the identity of the cell in which the cell edge experience occurred and the location of the cell edge experience.

Handover failure, cell reselection failure, cell redirection failure, or out-of-service experience may occur in the idle or the connected state. Further handover failure, cell reselection failure, cell redirection failure, or out-of-service experience may occur when a handover is attempted and does not succeed.

Once the UE 1220 event detector 1232 had detected a handover failure, cell reselection failure, cell redirection failure, or out-of-service experience, it may record the handover failure, cell reselection failure, cell redirection failure, or out-of-service experience by using the logging module 1236 to log parameters such as, for example: the time the cell edge experience was detected, the identity of the cell in which the cell edge experience occurred and the location of the cell edge experience, use of RSRP, RSRQ, MCS, bandwidth, HARQ termination information and MAC layer ACK/NAK information.

In the following materials the interaction between the UE 1220, eNB 1210 and the SON server is discussed. Generally speaking, the UE 1220 and/or eNB 1210 may report events as described above, such as but not limited to: Received/Missed Pages, Link Imbalance, Pilot Pollution, Cell edge experience, handover failure, cell reselection failure, cell redirection failure, or out-of-service experience to the SON server a number of different ways.

For example, the UE 1220 and/or eNB 1210 may report the events, or logs of the events, to the SON server periodically. Such periodic reporting may, for example, be in accordance with a SON policy, as shown in FIG. 11. In another aspect, the UE 1220 and/or eNB 1210 may report the events, or logs of the events, to the SON server on demand from the SON server. Such on demand reporting may, for example, also be in accordance with a SON policy, as shown in FIG. 11. Any and all reporting to the SON server may be done by the UE 1220 and the eNB 1210 via any means discussed herein, including the means discussed in the following sections.

Any and all information discussed in the context of the communication events above may be reported to the SON server. For example, logs, measurements, event detection and any associated data may be reported to the SON server. Alternatively or in addition, the same information may be stored in at least memory modules 1244 and/or logging modules 1236 (FIG. 12). Logs may be transmitted to the SON server or stored either to the memory modules 1244 and/or logging modules in their entirety or in any suitable segments, sections or subdivisions. Individual data from the logs, stored in the logging module 1236, collected by the measurements module 1234 or the event detector 1232 may be transmitted to the SON server or stored either to the memory modules 1244 and/or logging modules in their entirety or in any suitable segments, sections or subdivisions.

Initially, methods by which the SON server may optimize the network are more comprehensively discussed in provisional applications 61/037,443 and 61/109,024 incorporated herein by reference. Reports of the events discussed herein and all associated data may be used by the SON server to optimize the network in any suitable method discussed herein in any of the incorporated references.

For example, the SON server may correlate the logs from the eNB and the UE in order to diagnose problems with the network, make intelligent decisions regarding network parameters and further report issues and further problems. Examples of parameters that may be optimized include neighbor lists (NL) for individual UEs in order to increase/decrease signal as needed to remove holes in the network. Such NLs list the base stations to which the a particular UE can listen.

The SON server will optimize the network after a missed page. Network optimization general includes adding or removing cells from the neighbor list (NL). Neighbor List is the list of base stations that the UE can listen to.

Figure 13:
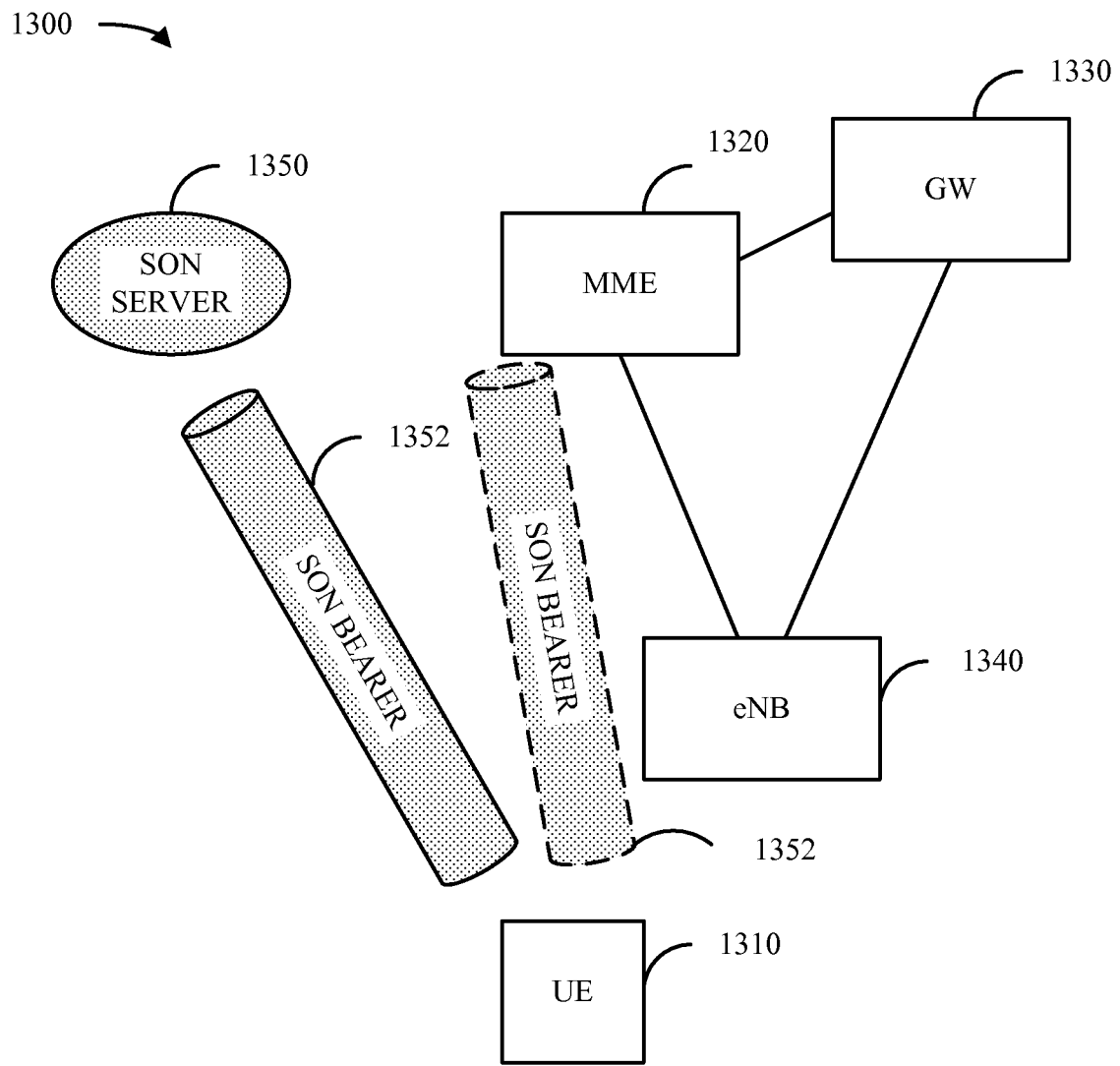

Turning to FIG. 13, a diagram 1310 is provided that illustrates an example implementation of a Self Optimized Network in accordance with various aspects. As diagram 1310 illustrates, a UE 1320 can interact with a network that includes a MME 1320, a gateway (GW) 1330, an eNB 1340, a SON server 1350, and/or any other suitable entities. In one example, MME 1320 can track movement of a UE 1320 throughout the network, initiate paging for UE 1320, and/or perform other suitable actions. In another example, GW 1330 can serve as a connecting point between UE 1320 and one or more data networks with which UE 1320 can communicate. Additionally and/or alternatively, GW 1330 can route data between one or more data networks and UE 1320. In an additional example, eNB 1340 can provide basic communication functionality for UE 1320 by, for example, scheduling resources to be used for transmission by UE 1320, performing power control for UE 1320, acting as a liaison between UE 1320 and other entities in the network (e.g., MME 1320, GW 1330, or the like), and/or performing other appropriate actions.

In accordance with one aspect, SON server 1350 can be utilized to implement Self-Optimized network management within the network illustrated by diagram 1310. For example, SON server 1350 can specify all or part of a SON policy to be utilized by UE 1320 (e.g., standardized events, techniques for logging events, techniques for reporting events, etc.). In one example, SON server 1350 can be implemented in conjunction with an operations and management (O&M) system within the network illustrated by diagram 1310. In such an example, the SON bearer can be a logical interface between the UE and the SON server in the operations and management (O&M) system. In another example, SON server 1350 can maintain a list of UEs 1320 in an associated network that have SON capability.

In accordance with another aspect, SON server 1350 can relay information relating to a SON policy for UE 1320 and/or other information to UE 1320 via a SON bearer 1352 in a first use 1352*a*. In the example implementation illustrated by diagram 1310, SON bearer 1352 in first use 1352*a* can be provided as a direct logical interface between UE 1320 and SON server 1350. In one example, SON bearer 1352 can also be utilized by UE 1320 to relay event reports and/or other suitable information back to SON server 1350.

FIG. 13 also shows an alternative example implementation of a Self Optimized Network is illustrated by diagram 1300 when then the SON Bearer 1352 is in a second use 1352*b*. In accordance with one aspect, MME 1320 can interface with SON server 1350 in use 1532*b* via any suitable wired and/or wireless communication method to obtain SON policy information from SON server 1350, which can subsequently be relayed to UE 1310 via a SON bearer 1352 between MME 1320 and UE 1310. In response, UE 1310 can provide information relating to events logged according to the SON policy and/or other suitable information to MME 1320 via the SON bearer 1352. Upon receiving such information, the information can be relayed by MME 1320 to SON server 1350.

Figure 14:
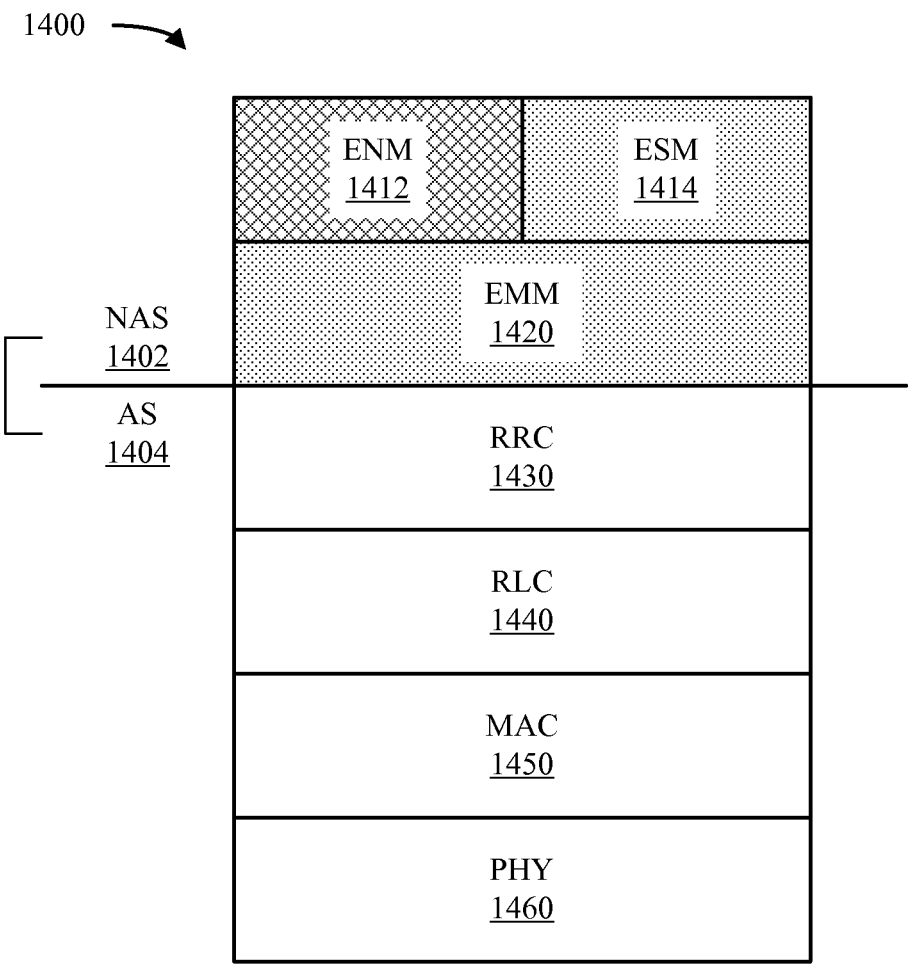
FIG. 14 illustrates an example communication protocol architecture that can be utilized to implement various aspects described herein.

In accordance with one aspect, SON bearer 1352 can be implemented as a control plane-based bearer using Non-Access Stratum (NAS) signaling between UE 1310 and MME 1320. In one example, a control plane-based SON bearer 1352 can be implemented by modifying a protocol stack utilized by the network illustrated by diagram 1300 to include a protocol for network management signaling. An example of a protocol stack that can be utilized for this purpose is illustrated by diagram 1400 in FIG. 14.

As diagram 1400 illustrates, a protocol stack utilized by a network can include one or more NAS signaling protocols 1402 and/or one or more Access Stratum (AS) signaling protocols 1404. NAS signaling protocols 1402 can include, for example, an EPS (Evolved Packet System) Session Management (ESM) protocol 1412 and/or an EPS Mobility Management (EMM) protocol 1420. AS signaling protocols 1404 can include, for example, a Radio Resource Control (RRC) protocol 1430, a Radio Link Control (RLC) protocol 1440, a Media Access Control (MAC) protocol 1450, and/or a Physical Layer (PHY) protocol 1460.

As further illustrated by diagram 1400, a protocol stack can be extended to include an EPS Network Management (ENM) protocol 1412, which can be utilized to exchange SON related information between a UE and MME (e.g., to implement SON bearer 1352 between UE 1320 and MME 1320). In one example, the ENM protocol 1412 can be defined to reside above and utilize existing functions of the EMM protocol 1420 in a similar manner to the ESM protocol 1414.

As an alternative example to the network implementations illustrated by diagrams 1300-1400, a SON bearer can be implemented as a user plane-based bearer between a UE and a Packet Data Network (PDN) GW. This can be implemented by, for example, utilizing an Internet Protocol (IP) bearer between the UE and PDN GW such that interaction between the UE and the SON server is regarded as an IP application function. For example, it could be that the SON bearer is an IP based application. In accordance with one aspect, a PDN GW in such an implementation can coordinate with one or more other GW nodes to provide SON functionality for a UE that leaves the local area associated with the PDN GW. Additionally and/or alternatively, one or more security measures can be implemented between the UE and the SON server to secure communication between the UE and SON server via the PDN GW. Further, one or more specifications generally known in the art, such as the Open Mobile Alliance (OMA) Device Management (DM) specification and/or any other suitable specification, can be utilized to set up and/or maintain a user plane bearer between a UE and a PDN GW and/or another suitable network entity.

Figure 15:
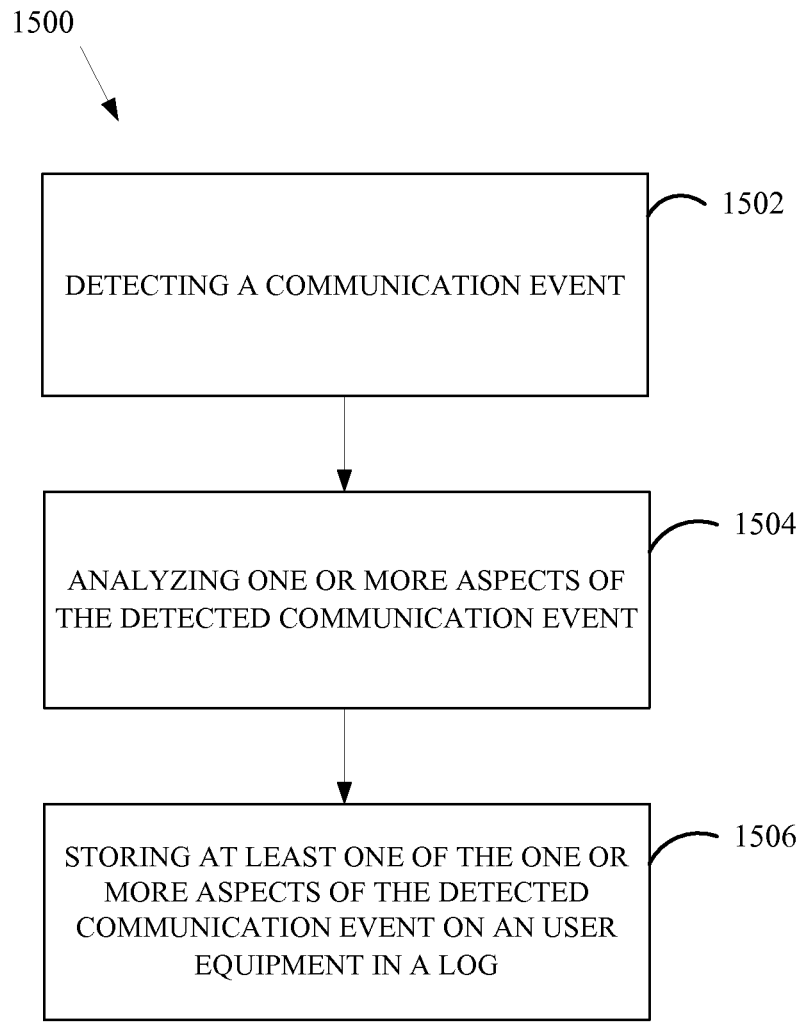
FIG. 15 is a flow chart of a method of wireless communication.

FIG. 15 illustrates various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring to FIG. 15, a system 1500 which may include a UE, a first eNB and a any suitable number of additional eNBs or UEs. Further, in operation in the system 1500, the UE may detect, record and report communication events for use in network optimization.

At reference numeral 1502, a UE may detect a communication event. In one aspect, the communication event comprises a page response. In another aspect, the communication event comprises a link imbalance. In this aspect, the detecting further comprises: identifying a first link having power control bits indicating up for a time period, identifying a first link having power control bits indicating down for a time period and identifying a second link having channel quality indicator bits that do not consistently give the same or similar indication as the power control bits of the first link for the time period. In another aspect, the communication event comprises an instance of pilot and data pollution, defined by two pilots having relative signal strength of within several dB. In this aspect, the detecting further comprises: comparing a number of detected pilots with a threshold pilot number and indicating an instance of pilot and data pollution where the number of detected pilots exceeds the threshold pilot number and identifying two or more pilots associated with the pilot and data pollution. In another aspect, communication event comprises an instance of cell edge experience. In this aspect, detecting further comprises: comparing a UE receive signal with a threshold receive signal; and indicating an instance of cell edge experience when at least one of the following occurs: the UE receive signal is less than the threshold receive signal for a time t. In another aspect, the communication event comprises an instance of handover failure, cell reselection failure, cell redirection failure, or out-of-service experience.

At reference numeral 1504, an UE may analyze one or more aspects of a communication event. In one aspect, the analyzing further comprises measuring the strength of two or more pilots associated with the pilot and data pollution.

At reference numeral 1506, an UE may store at least one of the one or more aspects of the detected communication event on a UE in a log. In one aspect, the storing further comprises storing a log of page responses, each with a time stamp. In another aspect, the storing further comprises storing at least one of: a time of the link imbalance, a cell ID associated with the link imbalance, a receive power level and a duration of the link imbalance. In another aspect, the storing further comprises storing at least one of: a time of the instance of pilot and data pollution, a cell ID, pilot IDs and a strength of at least one pilot. In another aspect, the storing further comprises storing further comprises storing at least one of: a time of the cell edge experience, a cell ID associated with the cell edge experience, a location of the cell edge experience, a use of RSRP, RSRQ, MCS, bandwidth, HARQ termination information and MAC layer ACK/NAK information. In another aspect, the storing further comprises storing at least one of: a time of the communication event, a cell ID associated with the communication event, a communication mode associated with the communication event, and a duration for which a UE camps on a cell with a cell ID associated with the communication event.

Figure 16:
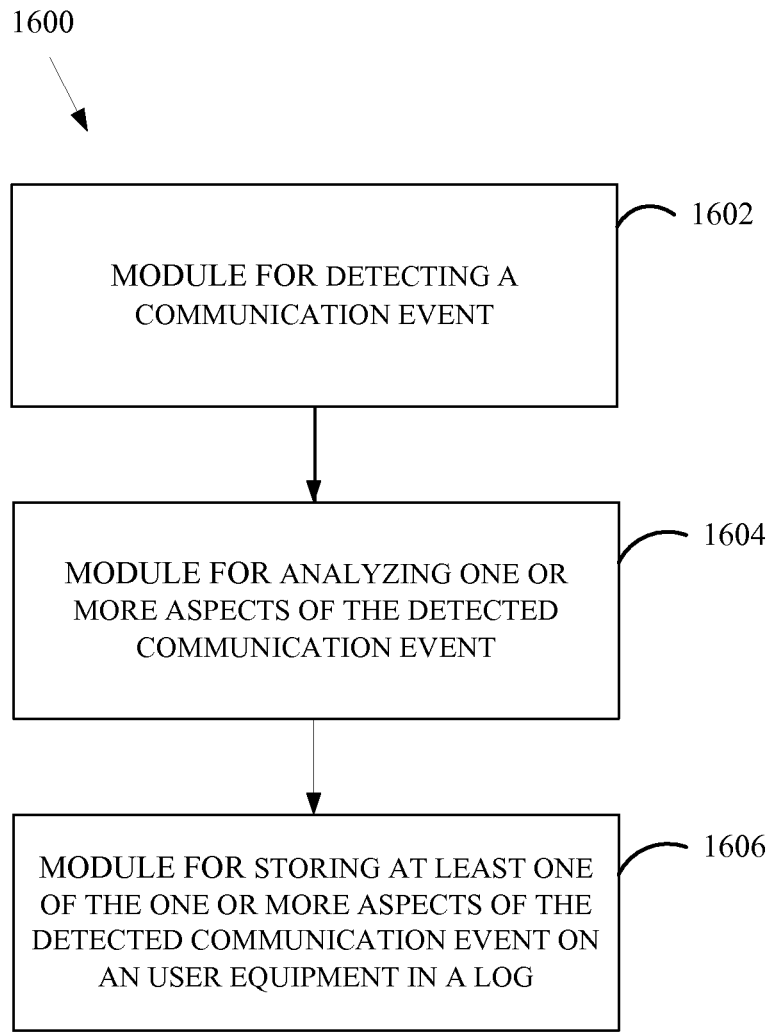
FIG. 16 is a conceptual block diagram illustrating the functionality of an exemplary apparatus.

FIG. 16 is a conceptual block diagram illustrating the functionality of an exemplary apparatus 1600. Referring to FIG. 16, a system 1600 which may include a UE, a first eNB and a any suitable number of additional eNBs or UEs. Further, in operation in the system 1600, the UE may detect, record and report communication events for use in network optimization.

The apparatus 1600 includes a module 1602 that may detect a communication event. In one aspect, the communication event comprises a page response. In another aspect, the communication event comprises a link imbalance. In this aspect, the detecting further comprises: identifying a first link having power control bits indicating up for a time period, identifying a first link having power control bits indicating down for a time period and identifying a second link having channel quality indicator bits that do not consistently give the same or similar indication as the power control bits of the first link for the time period. In another aspect, the communication event comprises an instance of pilot and data pollution, defined by two pilots having relative signal strength of within several dB. In this aspect, the detecting further comprises: comparing a number of detected pilots with a threshold pilot number and indicating an instance of pilot and data pollution where the number of detected pilots exceeds the threshold pilot number and identifying two or more pilots associated with the pilot and data pollution. In another aspect, communication event comprises an instance of cell edge experience. In this aspect, detecting further comprises: comparing a UE receive signal with a threshold receive signal; and indicating an instance of cell edge experience when at least one of the following occurs: the UE receive signal is less than the threshold receive signal for a time t. In another aspect, the communication event comprises an instance of handover failure, cell reselection failure, cell redirection failure, or out-of-service experience.

The apparatus 1600 includes a module 1604 that may analyze one or more aspects of a communication event. In one aspect, the analyzing further comprises measuring the strength of two or more pilots associated with the pilot and data pollution.

The apparatus 1600 includes a module 1606 that may store at least one of the one or more aspects of the detected communication event on a UE in a log. In one aspect, the storing further comprises storing a log of page responses, each with a time stamp. In another aspect, the storing further comprises storing at least one of: a time of the link imbalance, a cell ID associated with the link imbalance, a receive power level and a duration of the link imbalance. In another aspect, the storing further comprises storing at least one of: a time of the instance of pilot and data pollution, a cell ID, pilot IDs and a strength of at least one pilot. In another aspect, the storing further comprises storing further comprises storing at least one of: a time of the cell edge experience, a cell ID associated with the cell edge experience, a location of the cell edge experience, a use of RSRP, RSRQ, MCS, bandwidth, HARQ termination information and MAC layer ACK/NAK information. In another aspect, the storing further comprises storing at least one of: a time of the communication event, a cell ID associated with the communication event, a communication mode associated with the communication event, and a duration for which a UE camps on a cell with a cell ID associated with the communication event.

In one configuration, the apparatus 1600 for wireless communication includes means for detecting a communication event. In addition, the apparatus 1600 includes means for analyzing one or more aspects of the detected communication event. In addition, the apparatus 1600 includes means storing at least one of the one or more aspects of the communication event on a user log or equipment. The aforementioned means is the processing system 114 configured to perform the functions recited by the aforementioned means. As described supra, the processing system 114 includes the TX Processor 768, the RX Processor 756, and the controller/processor 759. As such, in one configuration, the aforementioned means may be the TX Processor 768, the RX Processor 756, and the controller/processor 759 configured to perform the functions recited by the aforementioned means.

Figure 17:
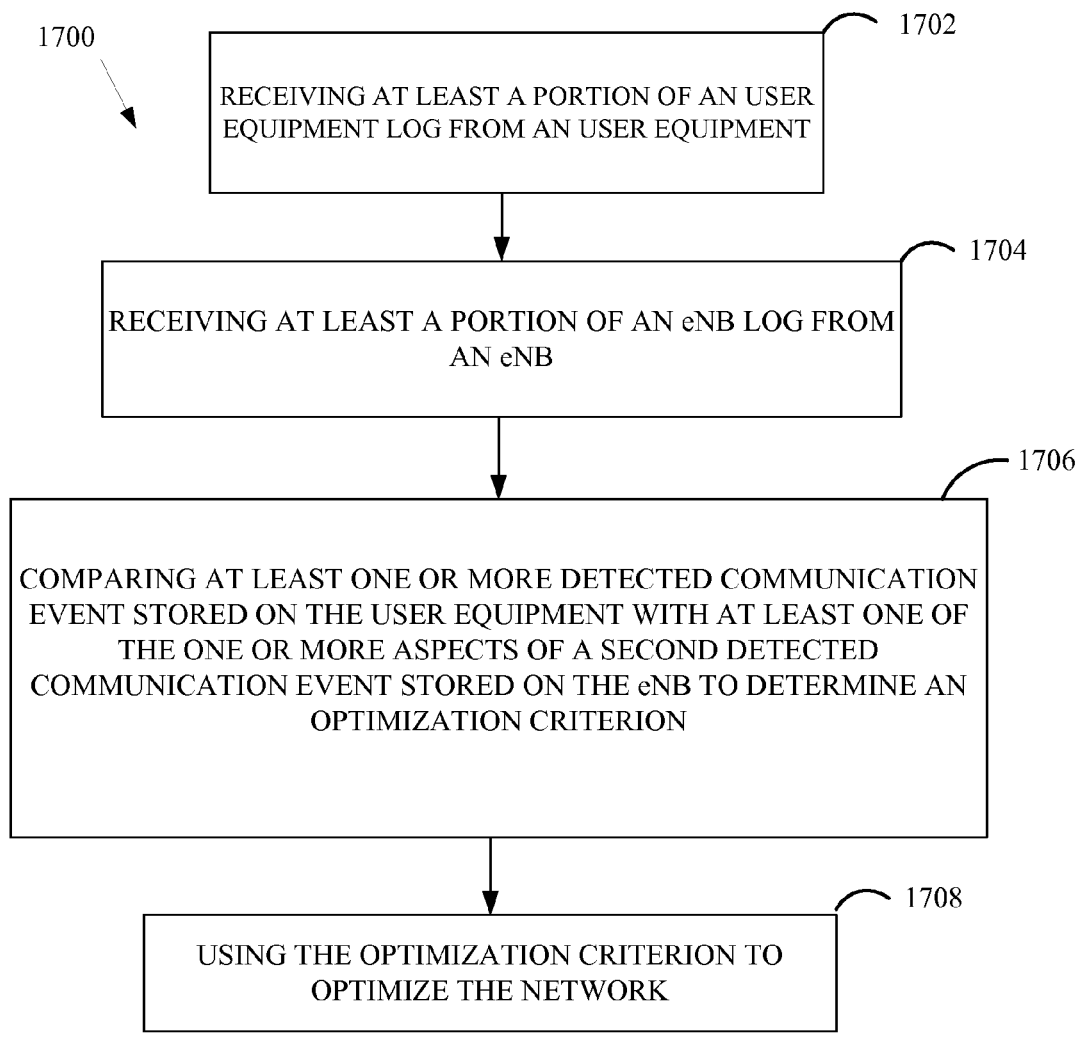
FIG. 17 is a flow chart of a method of wireless communication.

FIG. 17 illustrates various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring to FIG. 17, a system 1700 which may include a SON server, a UE, a first eNB and a any suitable number of additional eNBs or UEs. Further, in operation in the system 1700, the SON server may receive portions of user logs and compare those logs. At reference numeral 1702, the SON server may receive at least a portion of a UE log from a UE. At reference numeral 1704, the SON server may receive at least a portion of an eNB log from an eNB. At reference numeral 1706, the SON server may compare at least one or more detected communication event stored on the UE with at least one of the one or more aspects of a second detected communication event stored on the eNB to determine an optimization criterion. At reference numeral 1708, the SON server may use the optimization criterion to optimize the network.

In another aspect, the detected communication event comprises a page response and the second detected communication event comprises a missed page. In yet another aspect, the receiving further comprises receiving the at least a portion of a UE log and the at least a portion of an eNB log periodically.

Still another aspect comprises receiving the at least a portion of a UE log at least a portion of a eNB log in response to at least one of: a request from a SON server, the passing of a set time period, and a response initiated by one of the UE and the eNB.

In one aspect, at least one of the detected communication event and the second detected communication event comprises a link imbalance and wherein the aspects comprise at least one of: a time of the link imbalance, a cell ID associated with the link imbalance, a receive power level and a duration of the link imbalance. In this aspect, the at least one of the detected communication event and the second detected communication event is detected by identifying a first link having a pilot or sounding signal continually above a pilot threshold a time period; and the at least one of the detected communication event and the second detected communication event is further detected by identifying a second link having a pilot or sounding signal that does not consistently give the same or similar behavior with respect to the pilot threshold as the power control bits of the first link for the time period. In this aspect, at least one of the detected communication event and the second detected communication event may be detected by identifying a first link having a pilot or sounding signal continually below a pilot threshold a time period; and wherein at least one of the detected communication event and the second detected communication event is further detected by identifying a second link having a pilot or sounding signal that does not consistently give the same or similar behavior with respect to the pilot threshold as the power control bits of the first link for the time period.

In another aspect, at least one of the detected communication event and the second detected communication event comprises an instance of cell edge experience and wherein the aspects comprise at least one of: a time of the cell edge experience, a cell ID associated with the cell edge experience, a location of the cell edge experience, a use of RSRP, RSRQ, MCS, bandwidth, HARQ termination information and MAC layer ACK/NAK information. In this aspect, at least one of the detected communication event and the second detected communication event may be detected via: comparing a UE receive signal with a threshold receive signal; and indicating an instance of cell edge experience when at least one of the following occurs: the UE receive signal is less than the threshold receive signal for a time t.

In another aspect, at least one of the detected communication event and the second detected communication event comprises an instance of at least one of: handover failure, cell reselection failure, cell redirection failure, and out-of-service experience and wherein the aspects at least one of: a time of the communication event, a cell ID associated with the communication event, a communication mode associated with the communication event, and a duration for which a UE camps on a cell with a cell ID associated with the communication event. In this aspect, the communication mode may further comprise at least one of an idle state, an traffic state or a dormant state.

Figure 18:
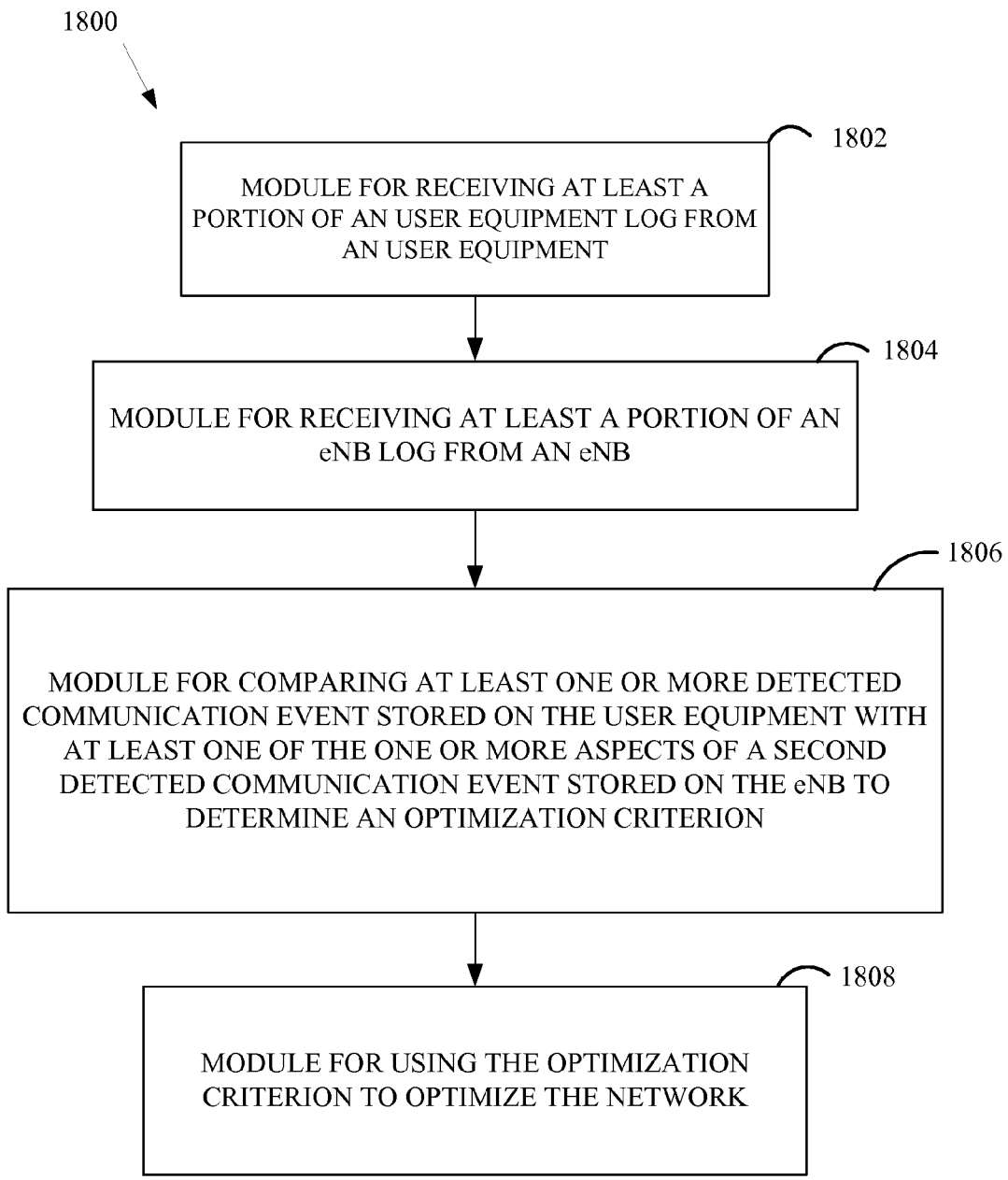
FIG. 18 is a conceptual block diagram illustrating the functionality of an exemplary apparatus.

FIG. 18 is a conceptual block diagram illustrating the functionality of an exemplary apparatus 1800. Referring to FIG. 18, a system 1800 which may include a SON server, UE, a first eNB and any suitable number of additional eNBs or UEs. Further, in operation in the system 1800, the UE may detect, record and report communication events for use in network optimization. Further, in operation in the system 1800, the SON server may receive portions of user logs and compare those logs.

The apparatus 1800 includes a module 1802 that may receive at least a portion of a UE log from a UE. Further, the apparatus 1800 includes a module 1804 that may receive at least a portion of an eNB log from an eNB. Still further, the apparatus 1800 includes a module 1806 that may compare at least one or more detected communication event stored on the UE with at least one of the one or more aspects of a second detected communication event stored on the eNB to determine an optimization criterion. Moreover, the apparatus 1800 includes a module 1808 that may use the optimization criterion to optimize the network.

In another aspect, the detected communication event comprises a page response and the second detected communication event comprises a missed page. In yet another aspect, the receiving further comprises receiving the at least a portion of a UE log and the at least a portion of an eNB log periodically. Still another aspect comprises receiving the at least a portion of a UE log at least a portion of a eNB log in response to at least one of: a request from a SON server, the passing of a set time period, and a response initiated by one of the UE and the eNB.

In one aspect, at least one of the detected communication event and the second detected communication event comprises a link imbalance and wherein the aspects comprise at least one of: a time of the link imbalance, a cell ID associated with the link imbalance, a receive power level and a duration of the link imbalance. In this aspect, the at least one of the detected communication event and the second detected communication event is detected by identifying a first link having a pilot or sounding signal continually above a pilot threshold a time period; and the at least one of the detected communication event and the second detected communication event is further detected by identifying a second link having a pilot or sounding signal that does not consistently give the same or similar behavior with respect to the pilot threshold as the power control bits of the first link for the time period. In this aspect, at least one of the detected communication event and the second detected communication event may be detected by identifying a first link having a pilot or sounding signal continually below a pilot threshold a time period; and wherein at least one of the detected communication event and the second detected communication event is further detected by identifying a second link having a pilot or sounding signal that does not consistently give the same or similar behavior with respect to the pilot threshold as the power control bits of the first link for the time period.

In another aspect, at least one of the detected communication event and the second detected communication event comprises an instance of cell edge experience and wherein the aspects comprise at least one of: a time of the cell edge experience, a cell ID associated with the cell edge experience, a location of the cell edge experience, a use of RSRP, RSRQ, MCS, bandwidth, HARQ termination information and MAC layer ACK/NAK information. In this aspect, at least one of the detected communication event and the second detected communication event may be detected via: comparing a UE receive signal with a threshold receive signal; and indicating an instance of cell edge experience when at least one of the following occurs: the UE receive signal is less than the threshold receive signal for a time t.

In another aspect, at least one of the detected communication event and the second detected communication event comprises an instance of at least one of: handover failure, cell reselection failure, cell redirection failure, and out-of-service experience and wherein the aspects at least one of: a time of the communication event, a cell ID associated with the communication event, a communication mode associated with the communication event, and a duration for which a UE camps on a cell with a cell ID associated with the communication event. In this aspect, the communication mode may further comprise at least one of an idle mode or a connected mode.

Referring to FIG. 18, in one configuration, the apparatus 1800 for wireless communication includes means for receiving at least a portion of a UE log from a UE wherein the UE log comprises one or more aspects of a detected communication event that has been analyzed and the results of the analysis stored on the UE. In one aspect, the aforementioned means is processor 1030, in SON optimization system 1000, configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for wireless communication, comprising:
   detecting, while a user equipment (UE) is in a connected state with a serving cell with communication occurring on an uplink and a downlink, an instance of handover failure;
   storing, in response to detecting an instance of handover failure, the detected instance of handover failure together with at least one of the following related aspects in the UE in a UE log: a time of the handover failure, a cell ID associated with the handover failure, a communication mode associated with the handover failure, and a duration for which a user equipment camps on a cell with a cell ID associated with the handover failure;
   storing in the UE log, in response to detecting an instance of handover failure, information associated with at least one of a reference signal received power (RSRP) of the serving cell or a reference signal received quality (RSRQ) of the serving cell; and
   storing in the UE log, in response to detecting an instance of handover failure, a data rate used by the UE,
   wherein the UE log comprises the detected instance of handover failure and corresponding at least one related aspect, at least one RSRP information or RSRQ information, and data rate used by the UE.

2. The method of claim 1 further comprising reporting at least a portion of the log.

3. The method of claim 2, wherein the reporting further comprises reporting the log periodically.

4. The method of claim 2, wherein the reporting further comprises reporting the at least a portion of the log in response to a request from a SON server.

5. The method of claim 2, wherein the reporting is done using a control plane bearer.

6. The method of claim 2, wherein the reporting is done using a user plane bearer.

7. A method for wireless communication, comprising:
detecting, while a user equipment (UE) is in a connected state with a serving cell with communication occurring on an uplink and a downlink, an instance of cell edge experience, wherein detecting comprises comparing a user equipment receive signal with a threshold receive signal and indicating an instance of cell edge experience when the user equipment receive signal is less than the threshold receive signal for a time t or longer;
storing, in response to detecting an instance of cell edge experience, the detected instance of cell edge experience together with at least one of the following related aspects in the UE in a UE log: a time of the cell edge experience, a cell ID associated with the cell edge experience, a location of the cell edge experience, a use of MCS, bandwidth, HARQ termination information and MAC layer ACK/NAK information;
storing in the UE log, in response to detecting an instance of cell edge experience, information associated with at least one of a reference signal received power (RSRP) of the serving cell or a reference signal received quality (RSRQ) of the serving cell; and
storing in the UE log, in response to detecting an instance of cell edge experience, a data rate used by the UE,
wherein the UE log comprises the detected instance of cell edge experience and corresponding at least one related aspect, at least one RSRP information or RSRQ information, and data rate used by the UE.

8. A method for wireless communication, comprising:
detecting, while a user equipment (UE) is in a connected state with a serving cell with communication occurring on an uplink and a downlink, an instance of out-of-service experience;
storing, in response to detecting an instance of out-of-service experience, the detected instance of out-of-service experience together with at least one of the following related aspects in the UE in a UE log: a time of the out-of-service experience, a cell ID associated with the out-of-service experience, a communication mode associated with the out-of-service experience, and a duration for which a user equipment has experienced the out-of-service experience and the cell ID at which the user equipment experienced the out-of-service experience;
storing in the UE log, in response to detecting an instance of out-of-service experience, information associated with at least one of a reference signal received power (RSRP) of the serving cell or a reference signal received quality (RSRQ) of the serving cell; and
storing in the UE log, in response to detecting an out-of-service experience, a data rate used by the UE,
wherein the UE log comprises the detected instance of out-of-service experience and corresponding at least one related aspect, at least one RSRP information or RSRQ information, and data rate used by the UE.

9. The method of claim 8, wherein the communication mode further comprises at least one of an idle mode or a connected mode.

10. A non-transitory computer-readable medium storing computer executable code for:
detecting, while a user equipment (UE) is in a connected state with a serving cell with communication occurring on an uplink and a downlink, an instance of handover failure;
storing, in response to detecting an instance of handover failure, the detected instance of handover failure together with at least one of the following related aspects in the UE in a UE log: a time of the handover failure, a cell ID associated with the handover failure, a communication mode associated with the handover failure, and a duration for which a user equipment camps on a cell with a cell ID associated with the handover failure;
storing in the UE log, in response to detecting an instance of handover failure, information associated with at least one of a reference signal received power (RSRP) of the serving cell or a reference signal received quality (RSRQ) of the serving cell; and
storing in the UE log, in response to detecting an instance of handover failure, a data rate used by the UE,
wherein the UE log comprises the detected instance of handover failure and corresponding at least one related aspect, at least one RSRP information or RSRQ information, and data rate used by the UE.

11. The computer program product of claim 10, further comprising reporting at least a portion of the log.

12. The computer program product of claim 10, wherein the reporting further comprises reporting the log periodically.

13. The computer program product of claim 10, wherein the reporting further comprises reporting the at least a portion of the log in response to a request from a SON server.

14. The computer program product of claim 10, wherein the reporting is done using a control plane bearer.

15. The computer program product of claim 10, wherein the reporting is done using a user plane bearer.

16. A non-transitory computer-readable medium storing computer executable code for:
detecting, while a user equipment (UE) is in a connected state with a serving cell with communication occurring on an uplink and a downlink, an instance of cell edge experience, wherein detecting comprises comparing a user equipment receive signal with a threshold receive signal and indicating an instance of cell edge experience when the user equipment receive signal is less than the threshold receive signal for a time t or longer;
storing, in response to detecting an instance of cell edge experience, the detected instance of cell edge experience together with at least one of the following related aspects in the UE in a UE log: a time of the cell edge experience, a cell ID associated with the cell edge experience, a location of the cell edge experience, a use of MCS, bandwidth, HARQ termination information and MAC layer ACK/NAK information;
storing in the UE log, in response to detecting an instance of cell edge experience, information associated with at least one of a reference signal received power (RSRP) of the serving cell or a reference signal received quality (RSRQ) of the serving cell; and
storing in the UE log, in response to detecting an instance of cell edge experience, a data rate used by the UE,
wherein the UE log comprises the detected instance of cell edge experience and corresponding at least one related aspect, at least one RSRP information or RSRQ information, and data rate used by the UE.

17. A non-transitory computer-readable medium storing computer executable code for:
  detecting, while a user equipment (UE) is in a connected state with a serving cell with communication occurring on an uplink and a downlink, an instance of out-of-service experience;
  storing, in response to detecting an instance of out-of-service experience, the detected instance of out-of-service experience together with at least one of the following related aspects in the UE in a UE log: a time of the out-of-service experience, a cell ID associated with the out-of-service experience, a communication mode associated with the out-of-service experience, and a duration for which a user equipment has experienced the out-of-service experience and the cell ID at which the user equipment experienced the out-of-service experience;
  storing in the UE log, in response to detecting an instance of out-of-service experience, information associated with at least one of a reference signal received power (RSRP) of the serving cell or reference signal received quality (RSRQ) of the serving cell; and
  storing in the UE log, in response to detecting an out-of-service experience, a data rate used by the UE,
  wherein the UE log comprises the detected instance of out-of-service experience and corresponding at least one related aspect, at least one RSRP information or RSRQ information, and data rate used by the UE.

18. An apparatus for wireless communication, comprising:
  at least one processor; and
  a memory coupled to the at least one processor, wherein the at least one processor is configured to:
    detect, while a user equipment (UE) is in a connected state with a serving cell with communication occurring on an uplink and a downlink, an instance of handover failure;
    store, in response to detecting an instance of handover failure, the detected instance of handover failure together with at least one of the following related aspects in the UE in a UE log: a time of the handover failure, a cell ID associated with the handover failure, a communication mode associated with the handover failure, and a duration for which a user equipment camps on a cell with a cell ID associated with the handover failure;
    store in the UE log, in response to detecting an instance of handover failure, information associated with at least one of a reference signal received power (RSRP) of the serving cell or a reference signal received quality (RSRQ) of the serving cell; and
    store in the UE log, in response to detecting an instance of handover failure, a data rate used by the UE,
    wherein the UE log comprise the detected instance of handover failure and its corresponding at least one related aspect, at least one RSRP information or RSRQ information, and data rate used by the UE.

19. The apparatus claim 18, wherein the at least one processor is further configured to:
  report at least a portion of the log.

20. The apparatus of claim 19, wherein the at least one processor is further configured to:
  report the log periodically.

21. The apparatus of claim 19, wherein the at least one processor is further configured to:
  report the at least a portion of the log in response to a request from a SON server.

22. An apparatus for wireless communication, comprising:
  at least one processor; and
  a memory coupled to the at least one processor, wherein the at least one processor is configured to:
    detect, while a user equipment (UE) is in a connected state with a serving cell with communication occurring on an uplink and a downlink, an instance of cell edge experience;
    store, in response to detecting an instance of cell edge experience, the detected instance of cell edge experience together with at least one of the following related aspects in the UE in a UE log: a time of the cell edge experience, a cell ID associated with the cell edge experience, a location of the cell edge experience, a use of MCS, bandwidth, HARQ termination information and MAC layer ACK/NAK information;
    store in the UE log, in response to detecting an instance of cell edge experience, information associated with at least one of a reference signal received power (RSRP) of the serving cell or a reference signal received quality (RSRQ) of the serving cell; and
    store in the UE log, in response to detecting an instance of cell edge experience, a data rate used by the UE,
    wherein the UE log comprises the detected instance of cell edge experience and corresponding at least one related aspect, at least one RSRP information or RSRQ information, and data rate used by the UE.

23. The apparatus of claim 22, wherein the at least one processor is further configured to compare a user equipment receive signal with a threshold receive signal and indicate an instance of cell edge experience when the user equipment receive signal is less than the threshold receive signal for a time t or longer.

24. The apparatus of claim 22, wherein the at least one processor is further configured to compare a user equipment receive signal with a threshold receive signal and indicate an instance of cell edge experience when there is a drop in a supported data rate to a very low data rate.

25. The apparatus of claim 22, wherein the at least one processor is further configured to compare a user equipment receive signal with a threshold receive signal and indicate an instance of cell edge experience when there is a large number of CRC failures.

26. An apparatus for wireless communication, comprising:
  at least one processor; and
  a memory coupled to the at least one processor, wherein the at least one processor is configured to:
    detect, while a user equipment (UE) is in a connected state with a serving cell with communication occurring on an uplink and a downlink, an instance of out-of-service experience;
    store, in response to detecting an instance of out-of-service experience, the detected instance of out-of-service experience together with at least one of the following related aspects in the UE in a UE log: a time of the out-of-service experience, a cell ID associated with the out-of-service experience, a communication mode associated with the out-of-service experience, and a duration for which a user equipment has experienced the out-of-service experience and the cell ID at which the user equipment experienced the out-of-service experience;
    store in the UE log, in response to detecting an instance of out-of-service experience, information associated with at least one of a reference signal received power (RSRP) of the serving cell or a reference signal received quality (RSRQ) of the serving cell; and storing in the UE log, in response to detecting an out-of-service experience, a data rate used by the UE,
wherein the UE log comprises the detected instance of out-of-service experience and corresponding at least one related aspect, at least one RSRP information or RSRQ information, and data rate used by the UE.

27. The apparatus of claim 26, wherein the communication mode further comprises at least one of an idle mode or a connected mode.

\* \* \* \* \*